(12) United States Patent
Chai et al.

(10) Patent No.: US 12,212,696 B2
(45) Date of Patent: Jan. 28, 2025

(54) FILE STORAGE METHOD, TERMINAL, AND STORAGE MEDIUM

(71) Applicant: JINGDONG TECHNOLOGY INFORMATION TECHNOLOGY CO., LTD., Beijing (CN)

(72) Inventors: Penghui Chai, Beijing (CN); Gui Fu, Beijing (CN)

(73) Assignee: JINGDONG TECHNOLOGY INFORMATION TECHNOLOGY CO., LTD., Beijing (CN)

( * ) Notice: Subject to any disclaimer, the term of this patent is extended or adjusted under 35 U.S.C. 154(b) by 477 days.

(21) Appl. No.: 17/772,206

(22) PCT Filed: Mar. 4, 2020

(86) PCT No.: PCT/CN2020/077840
§ 371 (c)(1),
(2) Date: Apr. 27, 2022

(87) PCT Pub. No.: WO2021/088278
PCT Pub. Date: May 14, 2021

(65) Prior Publication Data
US 2022/0407725 A1 Dec. 22, 2022

(30) Foreign Application Priority Data
Nov. 4, 2019 (CN) .......................... 201911067461.X

(51) Int. Cl.
*G06F 21/60* (2013.01)
*G06F 16/13* (2019.01)
(Continued)

(52) U.S. Cl.
CPC ................ *H04L 9/50* (2022.05); *G06F 16/13* (2019.01); *H04L 9/0618* (2013.01); *H04L 9/0825* (2013.01)

(58) Field of Classification Search
CPC . G06F 21/60; G06F 16/13; H04L 9/50; H04L 9/0825
See application file for complete search history.

(56) References Cited

U.S. PATENT DOCUMENTS 10,885,021 B1 * 1/2021 Llorca ................... G06F 16/252
2017/0287090 A1 10/2017 Hunn et al.
(Continued)

FOREIGN PATENT DOCUMENTS

CN 106686008 A 5/2017
CN 108876383 A 11/2018
(Continued)

OTHER PUBLICATIONS

Xu Jian etc, "Secure storage and access scheme for medical records based on blockchain", Journal of Computer Applications, May 10, 2019, DOI:10.11772/j. issn. 1001-9081. 2018102241. 7 pages with English translation.
(Continued)

*Primary Examiner* — Khang Do
(74) *Attorney, Agent, or Firm* — Finch & Maloney PLLC

(57) ABSTRACT

Embodiments of the present disclosure disclose a file storage method, terminal, and storage medium. The file storage method includes: obtaining a to-be-stored file, performing splitting processing on the to-be-stored file to obtain N sub-files corresponding to the to-be-stored file, wherein N is an integer greater than or equal to 1; sending the N sub-files to an IPFS, and receiving M pieces of address information corresponding to the N sub-files returned by the IPFS, wherein M is an integer greater than or equal to 1 and less than or equal to N; generating an address set corresponding to the to-be-stored file according to the M pieces of address information, and encrypting the address set to obtain an address set ciphertext; sending the address set ciphertext to a blockchain network and receiving a target index value
(Continued)

returned by the blockchain network, wherein the target index value is used to identify the address set ciphertext.

15 Claims, 30 Drawing Sheets

(51) Int. Cl.
*H04L 9/00* (2022.01)
*H04L 9/06* (2006.01)
*H04L 9/08* (2006.01)

(56) References Cited

U.S. PATENT DOCUMENTS

| | | | |
|---|---|---|---|
| 2018/0048461 A1* | 2/2018 | Jutla | H04L 9/3268 |
| 2018/0139042 A1 | 5/2018 | Binning et al. | |
| 2018/0174255 A1 | 6/2018 | Hunn et al. | |
| 2020/0159696 A1* | 5/2020 | Adluri | H04L 9/3239 |
| 2020/0242081 A1* | 7/2020 | Lee | G06F 16/1834 |
| 2020/0252457 A1* | 8/2020 | Zakrzewski | H04L 9/0637 |
| 2020/0412525 A1* | 12/2020 | Katsak | H04L 9/50 |
| 2021/0234702 A1* | 7/2021 | Bekiyants | A43B 1/0063 |
| 2021/0336796 A1* | 10/2021 | Wiklof | H04L 9/3228 |
| 2022/0171743 A1* | 6/2022 | Ohashi | G06F 16/122 |
| 2022/0198446 A1* | 6/2022 | Potanin | G06Q 20/401 |
| 2022/0200805 A1* | 6/2022 | Varilly | H04L 9/3218 |
| 2022/0210061 A1* | 6/2022 | Simu | H04L 9/3239 |
| 2022/0247570 A1* | 8/2022 | Watanabe | G06F 21/645 |
| 2022/0253230 A1* | 8/2022 | Ohashi | G06F 16/1873 |
| 2023/0117725 A1* | 4/2023 | Quigley | G06Q 20/326 705/65 |

FOREIGN PATENT DOCUMENTS

| | | |
|---|---|---|
| CN | 109151031 A | 1/2019 |
| CN | 109243583 A | 1/2019 |
| CN | 109493055 A | 3/2019 |
| CN | 109831527 A | 5/2019 |
| CN | 109886692 A | 6/2019 |
| CN | 110032545 A | 7/2019 |
| CN | 110062034 A | 7/2019 |
| CN | 110083606 A | 8/2019 |
| CN | 110099114 A | 8/2019 |
| JP | 2018081464 A | 5/2018 |
| JP | 2019153260 A | 9/2019 |
| JP | 2020088421 A | 6/2020 |
| WO | 2019124610 A1 | 6/2019 |

OTHER PUBLICATIONS

Bruno Rodrigues, "Evaluating a Blockchain-based Cooperative Defense", IEEE, 2019 IFIP/EEE International Symposiam on Integrated Network Management (IM2019): Experience Sessions, May 20, 2019. 6 pages.
Supplementary European Search Report in the European application No. 20885212.9, mailed on Apr. 17, 2023. 7 pages.
Duan Xinan et al., "Research and Trend Analysis on Blockchain Consensus Algorithm", e-Science Technology & Application, Nov. 30, 2017 (Nov. 30, 2017), entire document.
International Search Report in the international application No. PCT/CN2020/077840, mailed on Jul. 29, 2020.
English translation of the Written Opinion of the International Search Authority in the international application No. PCT/CN2020/077840, mailed on Jul. 29, 2020.

* cited by examiner one-click deployment: Hyperledger Fabric basic information
block domain name
aaa
domain name
aaa version No.
aaa
persistent storage
aaa organization
organization name
aaa
aaa
+ add organizations number of nodes
aaa
aaa number of users
aaa
aaa additional component
☑ add components ☐ exemplary list advanced ⌄ deployment

| console | ② cluster: trial-cluster ˅  logout |

BaaS
- overview
- blockchain
- application
- store
- cluster
- storage
- storage management
- add storage
- user node list

| please input the node name | query | click to query |

| node name | IP | role |
|---|---|---|
| demo | not applicable | |
| trial-cluster | 1.1/64 cores | |
| trial-cluster | trial-cluster | master |

☑ ☐ ˅ add storage

| * storage name | please input a storage name | | |
|---|---|---|---|
| * Node1: | please input a name | please input an IP | please input a device |
| * Node2: | please input a name | please input an IP | please input a device |

| install | × |

\* chaincode name: ccname

\* chaincode version: 2.0.1

\* initialized parameter: init, 32

\* organization: org0 node: please select a node...

\* channel: mychannel

[install] [cancel]

FILE STORAGE METHOD, TERMINAL, AND STORAGE MEDIUM

CROSS-REFERENCE TO RELATED APPLICATION

The present application is based on and claims priority to Chinese Patent Application NO. 201911067461.X, filed on Nov. 4, 2019, the content of which is hereby incorporated by reference in its entirety.

TECHNICAL FIELD

The present application relates to the technical field of terminals, and in particular, to a file storage method, terminal, and storage medium.

BACKGROUND

With the development of computer technology, the electronic products used by users are more and more diversified, and various data is generated by using the diversified electronic products, so that storage and protection requirements of the users for personal data are higher and higher. At present, blockchain systems are commonly used to manage, store, and retrieve the massive data.

For a file having a large amount of data, in an existing blockchain storage and retrieval mode, typically, a file is sent to a server, the file is splitted into a plurality of sub-files at the server, the plurality of sub-files are encrypted, the encrypted sub-files are stored, all the sub-files are obtained and decrypted through the server when a user downloads the file, then all the sub-files are merged into a file having a large amount of data, and then the file is returned to a terminal. As can be seen, the existing blockchain storage mode not only has a low encryption efficiency and poor security, but also causes excessive pressure on the server, and thus the storage requirements of the file having a large amount of data cannot be met.

SUMMARY

Embodiments of the present disclosure provide a file storage method, terminal, and storage medium, which not only greatly overcome defects of excessive pressure on a server caused by existing file storage methods, but also have small amount of data, high encryption efficiency, and high file storage security, greatly meeting the storage requirements for files having a large amount of data.

The technical solutions of the embodiments of the present disclosure are implemented as follows.

An embodiment of the present disclosure provides a file storage method, the method including:

obtaining a to-be-stored file, and performing splitting processing on the to-be-stored file to obtain N sub-files corresponding to the to-be-stored file, wherein N is an integer greater than or equal to 1;

sending the N sub-files to an InterPlanetary File System (IPFS) and receiving M pieces of address information corresponding to the N sub-files returned by the IPFS, wherein M is an integer greater than or equal to 1 and less than or equal to N;

generating an address set corresponding to the to-be-stored file according to the M pieces of address information, and encrypting the address set to obtain an address set ciphertext;

sending the address set ciphertext to a blockchain network and receiving a target index value returned by the blockchain network, wherein the target index value is used to identify the address set ciphertext.

An embodiment of the present disclosure provides a terminal including an obtaining portion, a processing portion, a sending portion, a receiving portion, a generating portion and an encryption portion.

The obtaining portion is configured to obtain a to-be-stored file.

The processing portion is configured to perform splitting processing on the to-be-stored file to obtain N sub-files corresponding to the to-be-stored file, wherein N is an integer greater than or equal to 1.

The sending portion is configured to send the N sub-files to an IPFS.

The receiving portion is configured to receive M pieces of address information corresponding to the N sub-files returned by the IPFS, wherein M is an integer greater than or equal to 1 and less than or equal to N.

The generating portion is configured to generate an address set corresponding to the to-be-stored file according to the M pieces of address information.

The encryption portion is configured to encrypt the address set to obtain an address set ciphertext.

The sending portion is further configured to send the address set ciphertext to a blockchain network.

The receiving portion is further configured to receive a target index value returned by the blockchain network, wherein the target index value is used to identify the address set ciphertext.

An embodiment of the present disclosure provides a terminal including a processor and a memory storing processor-executable instructions that when executed by the processor, implement the file storage method as described above.

An embodiment of the present disclosure provides a computer-readable storage medium applied to a terminal and having stored there on a program that when executed by a processor, implements the file storage method as described above.

Embodiments of the present disclosure provide a file storage method, terminal, and storage medium. The terminal obtains a to-be-stored file, and performs splitting processing on the to-be-stored file to obtain N sub-files corresponding to the to-be-stored file, wherein N is an integer greater than or equal to 1; sends the N sub-files to the IPFS and receives M pieces of address information corresponding to the N sub-files returned by the IPFS. Here, M is an integer greater than or equal to 1 and less than or equal to N. The terminal generates an address set corresponding to the to-be-stored file according to the M pieces of address information, and encrypts the address set to obtain an address set ciphertext; stores the address set ciphertext to a blockchain network and receives a target index value returned by the blockchain network. Here, the target index value is used to identify the address set ciphertext. That is, in the embodiment of the present disclosure, the terminal splits and uploads the to-be-stored file to the IPFS, generates the address set according to received addresses corresponding to a plurality of sub-files returned by the IPFS, encrypts the address set, and further stores the address set ciphertext to the blockchain network. It not only overcomes, to a large extent, the defects of excessive pressure on the server side caused by the existing file storage methods, but also reduces the amount of stored data, provides efficient encryption and high file storage security, greatly meeting the storage requirements for files having a large amount of data.

DETAILED DESCRIPTION

Figure 1:
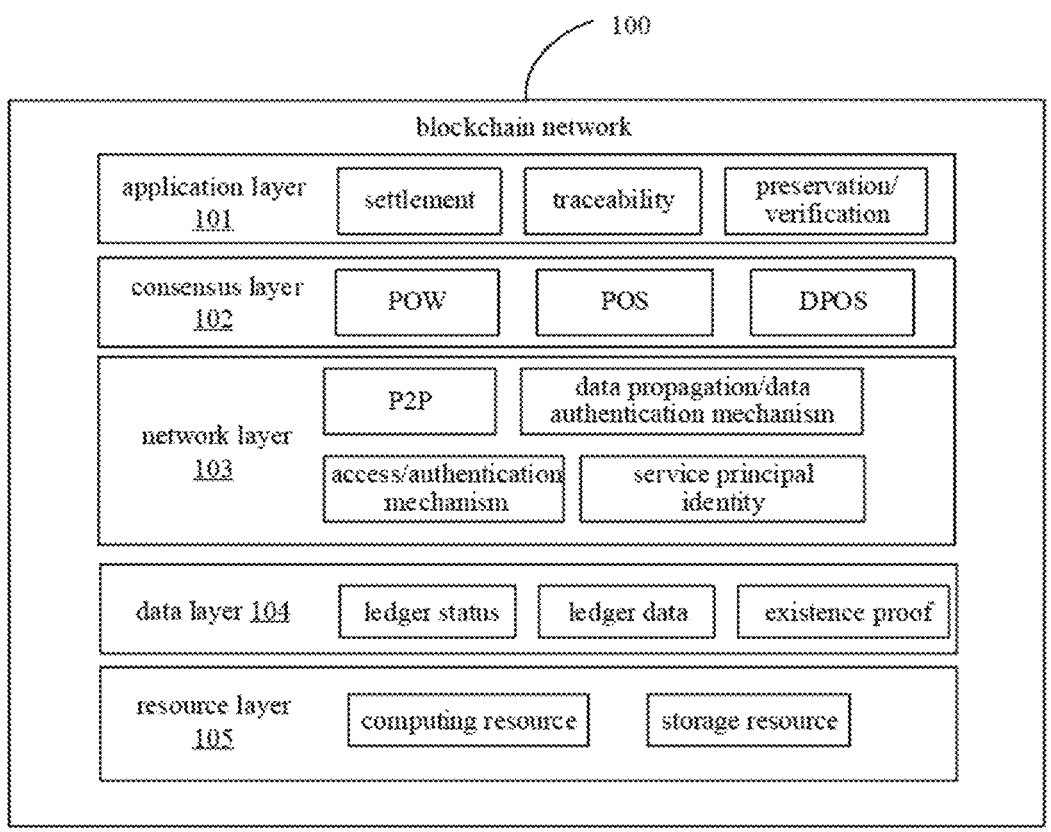
FIG. 1 is a schematic diagram of a functional architecture of a blockchain network service platform according to an embodiment of the present disclosure.

The technical solutions of the embodiments of the present disclosure will be described clearly and completely with reference to the accompanying drawings in the embodiments of the present disclosure. It will be appreciated that the specific embodiments described herein are intended only to explain the relevant disclosure and not to limit the disclosure. It is also to be noted that, for ease of description, only parts related to the related disclosure are shown in the drawings.

Unless otherwise defined, all technical and scientific terms used herein have the same meaning as the meaning that those skilled in the art of the present disclosure generally understand. The terms used herein are intended solely for the purpose of describing embodiments of the present disclosure and are not intended to limit the present disclosure.

Before further describing the embodiments of the present disclosure in detail, nouns and terms involved in the embodiments of the present disclosure are described. The following explanation may be applied to the nouns and terms involved in the embodiments of the present disclosure.

1) An IPFS is a network transport protocol designed to create persistent and distributed storage and sharing of files. An IPFS is universal and has a minimal storage restriction. The file serviced by the IPFS can be large or small. The IPFS may automatically splits a large file into small blocks, so that a node can not only download the file from a server like the HyperText Transfer Protocol, but also download the file synchronously from hundreds of servers. The IPFS may split a large file into slices in a fixed size and store the splitted files as plaintext in the system.

2) A blockchain network is a set of series of uncentralized nodes, in which a new block is incorporated in a blockchain in a consensual manner.

3) A blockchain is a decentralized distributed database system in which nodes participate, and is a linked data structure composed of blocks in sequential connection. A hash value or a subset of the previous block are referenced in each block to ensure, in a cryptographic manner, that a recorded transaction is not tampered with or forged. The blockchain is a distributed stored data structure which is public to all blockchain nodes accessing a server, and include several blocks. A user terminal including a client may register as a blockchain node. Each blockchain node device acts as a blockchain node and forms a peer to peer lending (P2P) network with other blockchain nodes accessing a blockchain server. Blockchain data may be stored in the peer to peer lending network. A failure of any one or more blockchain nodes will not result in loss of blockchain data, so that the blockchain data has a great security and ensures that the blockchain data is permanently stored and is not tampered with. When a block is persisted to the blockchain data, the blockchain nodes accessing the server can be added to the block. The blocks are added to the blockchain data one by one in an order of persistence duration, and each block except the first block in the blockchain data is linked to its previous block, so that the blockchain data forms a block link, which is like a chain. When a block is persisted to the blockchain data, the block cannot be modified.

4) A block is a data structure of ledger data updated by transaction for a period of time, and is marked with a timestamp and a unique mark (e.g., a digital fingerprint) of a previous block. After the block is verified by consensus of the nodes in the blockchain network, the block is added to the end of the blockchain to become a new block.

5) A transaction, which is equivalent to the computer term "item", includes three different simulated transaction operations including: Deploy, Invoke, and Query. A deployment transaction is used to install a specified chaincode to the nodes of the blockchain network. An invocation transaction and a query transaction are used to invoke the chaincode of a deployment number, so as to perform operations on data related to a target account in a ledger, the operations may include adding, deleting, querying, and modifying operations to modify data in a Key-Value pair form in the account, or adding a new account in the ledger. The transaction does not solely refer to a transaction in a commercial context, but in view of the fact that the term "transaction" is used through common practice in the blockchain technology, the embodiments in the present disclosure follow the practice.

6) Ledger is a sum of data recorded in the blockchain network in the dimension of account, and includes ledger data, ledger status, ledger status proof, block index, or the like.

7) The ledger data is actual block data storage, that is, a record of a series of orderly and tamper-proof transactions recorded in the blockchain. The ledger data may be represented as files in a file system. When a smart contract invoked in the transaction is executed, account/data in the account is updated.

8) The ledger status is also referred to as status data, that is, a status of the ledger data, and may be expressed in the form of a key-value pair in the end of the database. Real-time ledger status is used to indicate the latest record of the key-value pair updated by a consensus transaction, and historical ledger status is used to indicate a historical record of the key-value pair.

9) The consensus is a process in a blockchain network for reaching an agreement on a transaction result between a plurality of involved nodes. Mechanisms for achieving the consensus include Proof Of Work (POW), Proof Of Stake (POS), Delegated Proof-Of-Stake (DPOS), Proof Of Elapsed Time (POET), or the like.

10) The Smart Contract is also known as a Chaincode, the program chaincode is deployed in the blockchain network and its execution is triggered according to conditions, the program chaincode runs in a secure container to initialize and manage the ledger data and the ledger status.

11) Container orchestration is a technique of container scheduling and clustering, provides a basic mechanism for providing services using containers and orchestrating and determining how the containers interact with each other based on container application scalability. The following describes an exemplary functional architecture of the blockchain network for implementing an embodiment of the present disclosure. FIG. 1 is a schematic diagram of a functional architecture of a blockchain network service platform according to an embodiment of the present disclosure, wherein the blockchain network service platform includes an application layer 101, a consensus layer 102, a network layer 103, a data layer 104, and a resource layer 105.

The resource layer 105 encapsulates various available computing and storage resources, such as computing and storage resources in computers, servers/clusters, and clouds, abstracts the computing and storage resources, and provides a unified interface to the data layer 104 to shield differences between underlying hardwares that implement the resource layer 105.

The computing resources include various forms of processors, such as a Central Processing Unit (CP), an Application Specific Integrated Circuit (ASIC), and a Field-Programmable Gate Array (FPGA).

The storage resources include various types of storage media such as various volatile memories and non-volatile memories. The non-volatile memory may be a Read-Only Memory (ROM) and a Programmable Read-Only Memory (PROM). The volatile memory may be a Random Access Memory (RAM) that functions as an external cache.

The computing resources and the storage resources of the resource layer 105 may be mapped to various types of nodes in a blockchain network. The storage medium implementing an embodiment of the present disclosure stores executable instructions for implementing a blockchain network deployment method of an embodiment of the present disclosure. Once the executable instructions deployed to the nodes are executed, underlying resources (e.g., various types of processors) for implementing the node will implement the deployment of the various types of nodes in the blockchain network and perform the functions of the various types of nodes, thereby implementing a ledger for a transaction in a business process and various applications based on the ledger.

By way of example, the executable instructions may be written in the form of software (including system programs and application programs), software modules, scripts, plug-ins, etc., and may be written in any form of programming language (including compilation or interpretation languages, or declarative or procedural languages), and may be deployed in any form including stand-alone programs or as modules, components, or other units suitable for use in a computing environment.

The data layer 104 encapsulates various data structures for implementing the ledger, including ledger data implemented in a file system and ledger status and existence proof implemented in a database.

The network layer 103 encapsulates a P2P network protocol, a data propagation mechanism and a data authentication mechanism, an access and authentication mechanism, and a service principal identity. The P2P network protocol implements communication between the nodes in the blockchain network. The data propagation mechanism ensures propagation of a transaction/transaction result in the blockchain network. The data authentication mechanism is used to achieve reliability of data transmission between the nodes based on a cryptographic method (e.g., a digital certificate, a digital signature, a public/private key pair). The access and authentication mechanism is used to manage access and authentication of a terminal based on the service principal identity.

The consensus layer 102 encapsulates a mechanism for achieving consistency of the transaction result propagated in the blockchain, including POS, POW, DPOS, or the like, supporting pluggability of a consensus mechanism.

The application layer 101 encapsulates various services that the blockchain network can implement, including transaction settlement, traceability, and certificate storage.

Figure 2:
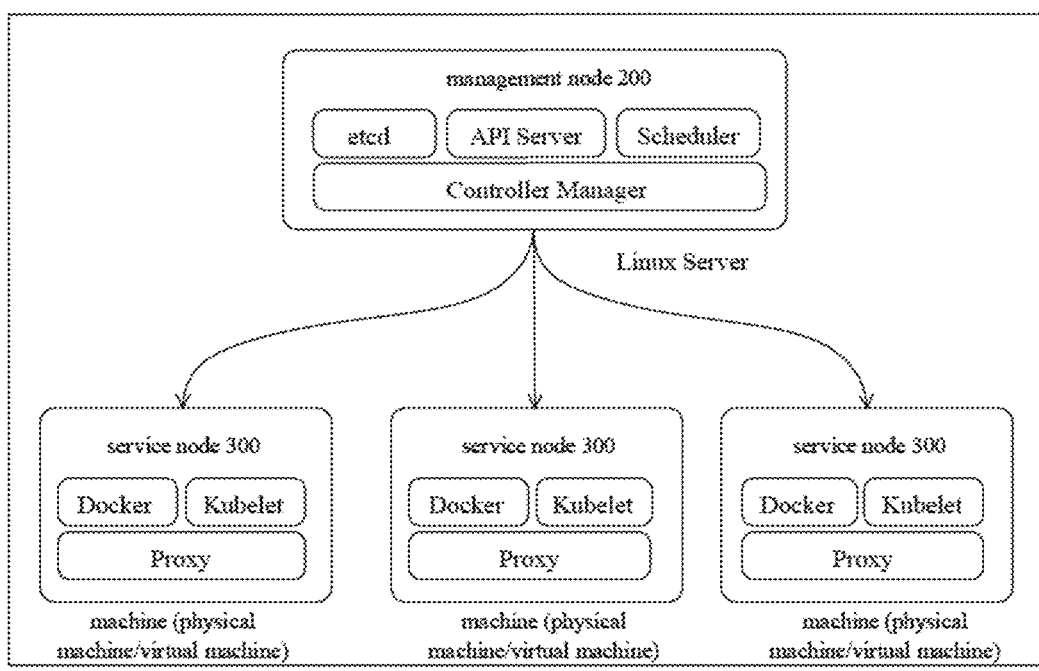
FIG. 2 is a schematic structural diagram of a resource layer, which is constructed as a container cluster 200 by deploying a containerized management system, according to an embodiment of the present disclosure.

FIG. 2 is a schematic structural diagram of a resource layer constructed as a container cluster 200 by deploying a containerized management system according to an embodiment of the present disclosure. Two types of nodes, including a management node (Master Server) 200 and a service node 300, are formed in a machine that provides resources to the resource layer by deploying corresponding components of the containerized management system. The management node is used to manage scheduling and operation of a container in the service node. The service node is mainly used to operate various containers, provides isolated operation environment for various applications in a blockchain network. For example, the service node is used to operate a chaincode container of a chaincode, or the service node is used to operate a node container of node codes (i.e., codes of various types of nodes in the blockchain network), which will be described hereinafter.

The management node (Master Server) 200 is responsible for managing a cluster, providing an entry for accessing resource data of the cluster to the outside in the form of a service. The management node may include several exemplary components.

1) A state component (etcd) is used to hold a state of the entire cluster.

2) An application programming interface service server component is used to provide an only entry to resource operations and provide mechanisms such as authentication, authorization, access control, application programming interface (API) registration, and discovery.

3) A scheduler component is used to schedule resources, which schedules the container for operation on appropriate nodes in accordance with a predetermined scheduling policy. A container cluster (Plain old data structure, Pod) of the same set of resources in a shared machine (i.e., a machine that deploys a service node component) in the container run by the service node is the smallest unit of invocation. It may be implemented by one or more container clusters for a blockchain network application. The resources shared by the containers in the container cluster include an application program namespace, a network namespace, a host name, and a storage volume.

Taking a shared storage volume as an example, when a shared file system component is deployed on the node, such as a Network File System (NFS), a Gluster File system (GlusterFS), and a Ceph File System (Cephfs), the scheduler component can easily schedule (mount) a container cluster installed on the storage volume to a storage volume of another machine (node).

4) A controller manager component is used to monitor/maintain a status of the cluster, monitor in real time the current status of each resource object of the entire cluster through an interface provided by the application programming interface service component, and repair a system status to a desired status when the occurrence of various failures results in changes in the system status.

5) A replication controller (RC) component performs control such that there are always a certain number of Pod replications that operate within a period of time. For example, if the number of running Pod replications exceed a set value, a part of the Pod replications are closed; and if the number of Pod replications is less than the set value, a new Pod replication is created.

6) A deployment controller component is used to manage and maintain a resource object-deployment object in a container cluster, associate a deployment object and the replication controller, provide a declarative updating for the container cluster and the replication controller in the deployment object, so as to declare a target state of the container cluster and the replication controller. In this way, when the deployment object is updated, the replication controller and the container cluster are controlled to be updated.

The serving node 300 includes the following exemplary components.

1) A container engine (denoted as Docker) is responsible for all specific mirror downloads and container operations.

2) A daemon component (denoted as Kubelet) is used to maintain the lifecycle (creation, starting, and stopping) of the container and to manage the storage volume and the container network interface (CNI).

Taking the management of the storage volume as an example, the daemon component installs each container in one container cluster to the same storage volume through components of the shared file system deployed in the node, such as a Network File System (NFS), a Gluster File System (GlusterFS), and a Ceph File System (Cephfs), so that each container uses the same storage volume to store data produced during operation. The data in the storage volume can be accessed by any container in the same container cluster.

3) A load balancing component (denoted as Proxy) is responsible for providing service discovery and load balancing within the cluster.

Based on the cluster shown in FIG. 2, an exemplary process for deploying an mirror of an application of a blockchain network is encapsulated into a container cluster (referred to as a target Pod in the example below) and running at a node (referred to as a target Node in the example below) is described below.

Firstly, a management tool (Kubectl) of the container cluster 200 submits a request to create a replication controller RC, including definition of the target Pod, a number of replications that the target Pod needs to run, a target Pod lable to be monitored, or the like.

Next, the request is written into etcd through the API Server. At this time, the Controller Manager detects the RC event through an interface where a resource change of the API Server is monitored, and finds that there is no corresponding Pod instance in the current cluster, and then defines and generates a Pod object according to a Pod template in the Pod, and writes the Pod object into the etcd through the API Server.

Then, the RC event is discovered by the Scheduler, which immediately executes a scheduling process. i.e., selecting a settled node for the new Pod and then writing the result into the etcd through the API Server. Then, the Kubelet process running on the target Node monitors the new Pod through the API Server and starts the new Pod according to its definition until the life of the Pod ends.

Then, the Kubectl submits a new creation request for the service mapped to the target Pod. The Controller Manager queries an associated Pod instance through the label, then generates endpoints information (including an address and a port) of the service, and writes the endpoints information into the etcd through the API Server. The proxy processes running on all nodes in the container cluster query and monitor a service object and the endpoints information corresponding to the service object through the API Server, and establish a load balancer in a software mode to implement the traffic forwarding function that the service accesses the backend Pod.

As can be seen from the above, the blockchain network service platform for implementing the embodiment of the present disclosure is implemented by deploying a container cluster at a resource layer and running a container encapsulated with a blockchain network application. Therefore, the blockchain network for implementing the embodiment of the present disclosure may be provided in the form of a memory and a processor, wherein the memory stores executable instructions. When the executable instructions are executed by the processor, the container cluster is established on a plurality of nodes running the processor and the memory. The method for installing a chaincode in the blockchain service network platform of the embodiment of the present disclosure is implemented by running the encapsulated application in the container.

The blockchain network platform for implementing the embodiment of the present disclosure is connected to a developer in various ways, and provides various graphical ways for deployment and management of the blockchain network, which will be described below.

Figure 3:
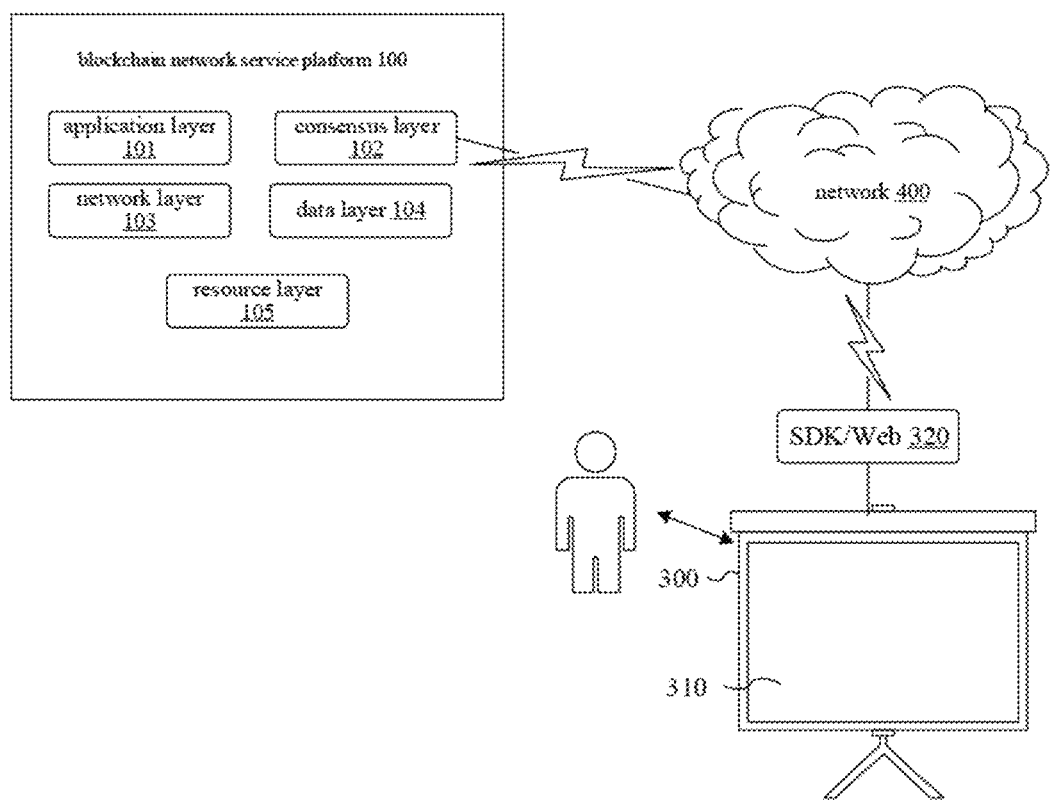
FIG. 3 is a schematic diagram of a developer accessing a blockchain network service platform 100 through a terminal 300 according to an embodiment of the present disclosure.

FIG. 3 is a schematic diagram of a developer accessing the blockchain network service platform 100 through a terminal 300 according to an embodiment of the present disclosure. An interface of a software development kit (SDK)/World Wide Web (Web) 320 connects to a corresponding SDE/Web interface of a data layer 104 in the blockchain network service platform 100. The SDK/Web 320 of the developer terminal 300 supports remote deployment of a blockchain network supporting a specific service in the developer terminal 300, and displays management pages of various functions of the blockchain network service platform 100 in a graphical interface 310 of the terminal 300, including creation of a container cluster and access of a new container cluster, management of storage resources, one-click deployment of a blockchain network, chaincode management (running status viewing), application store management, or the like.

Figure 4A:
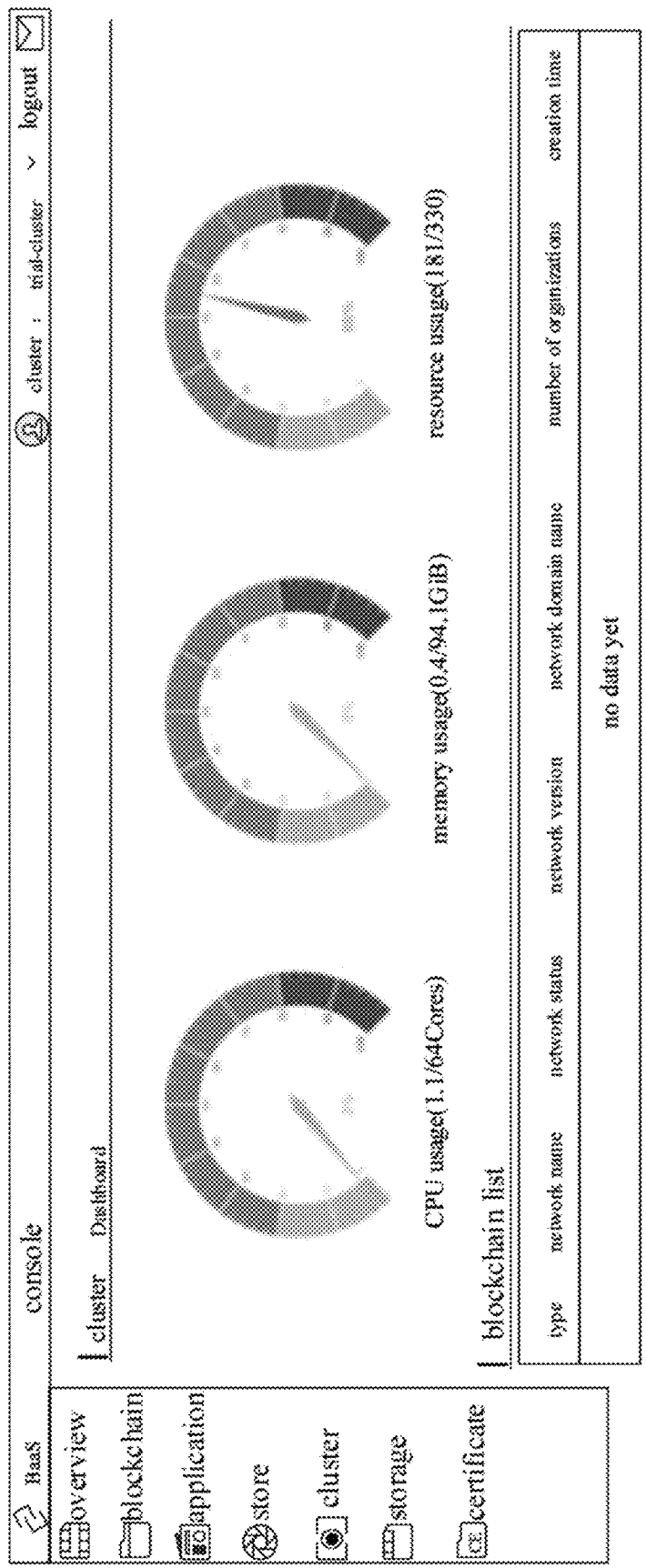
FIGS. 4A to 4Q are diagrams showing various function management pages of a blockchain network service platform according to an embodiment of the present disclosure.
Figure 4C:
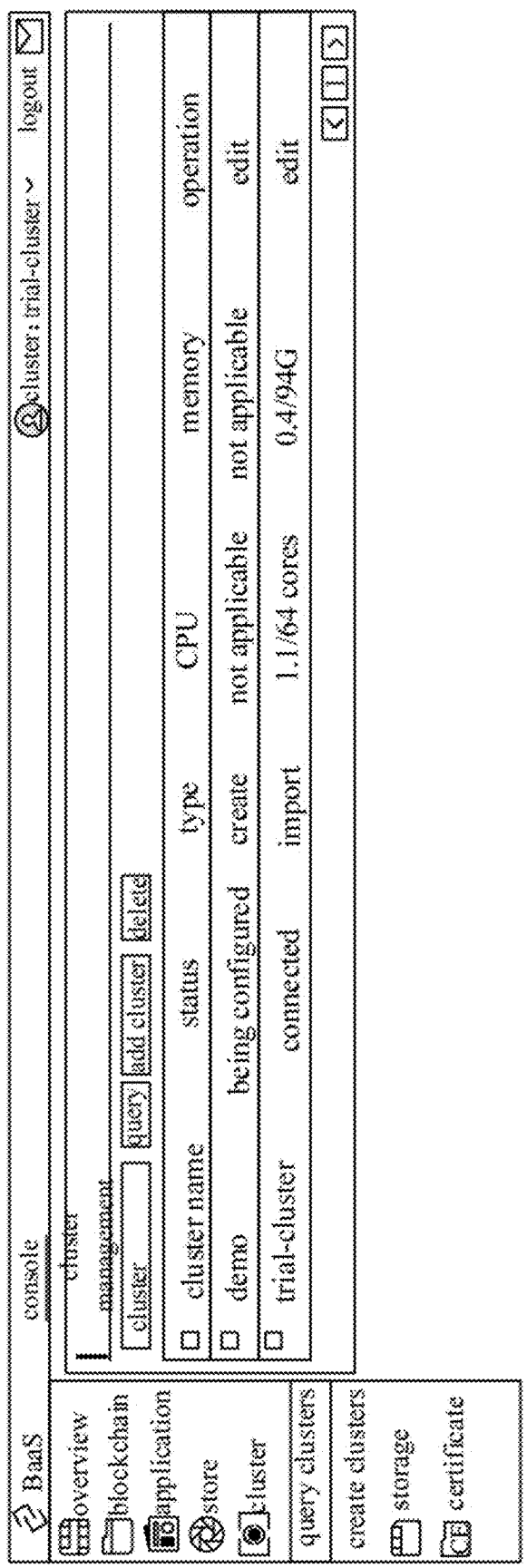
Figure 4D:
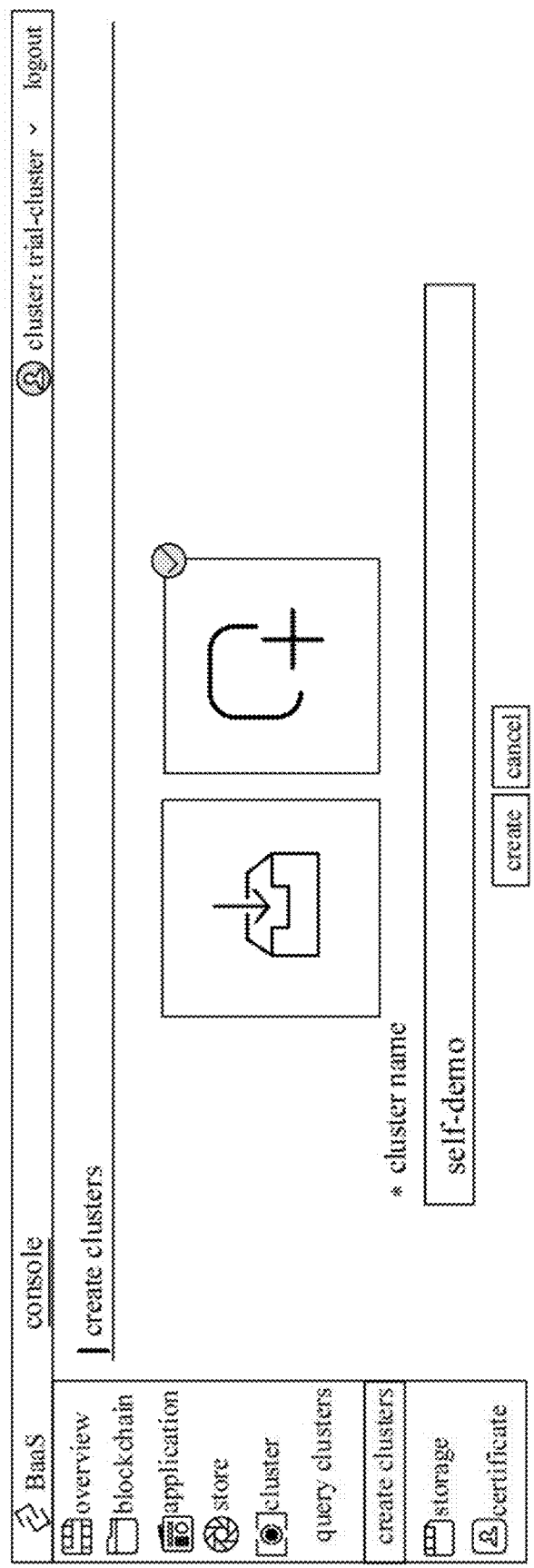
Figure 4E:
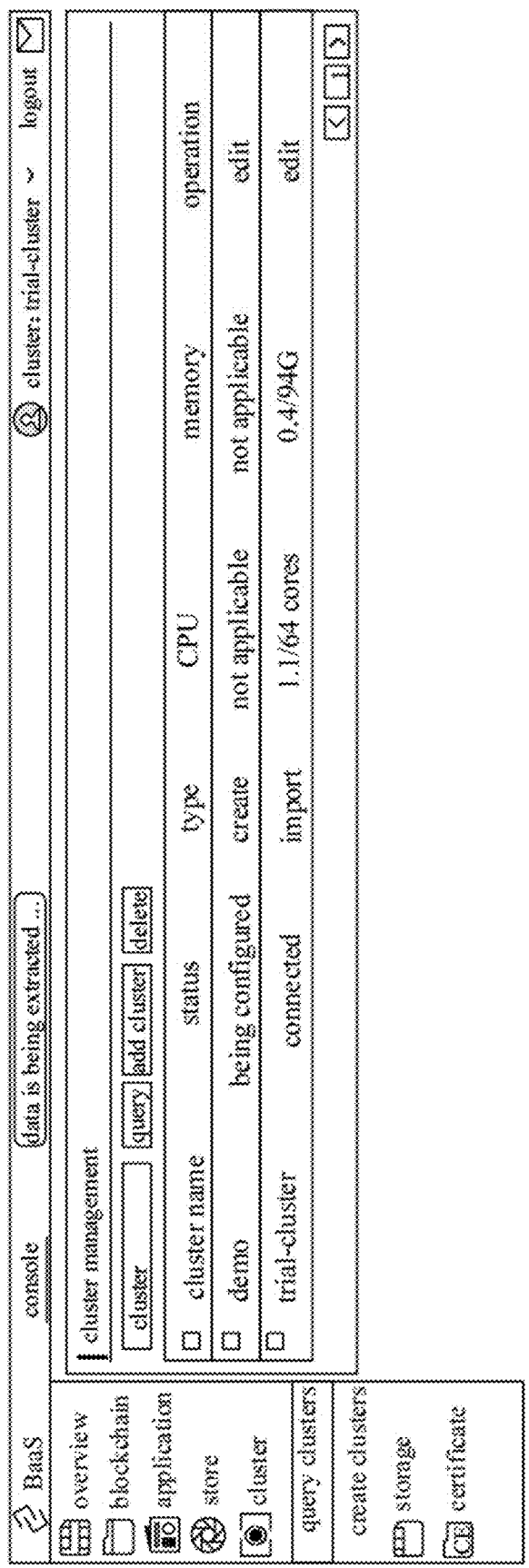
Figure 4F:
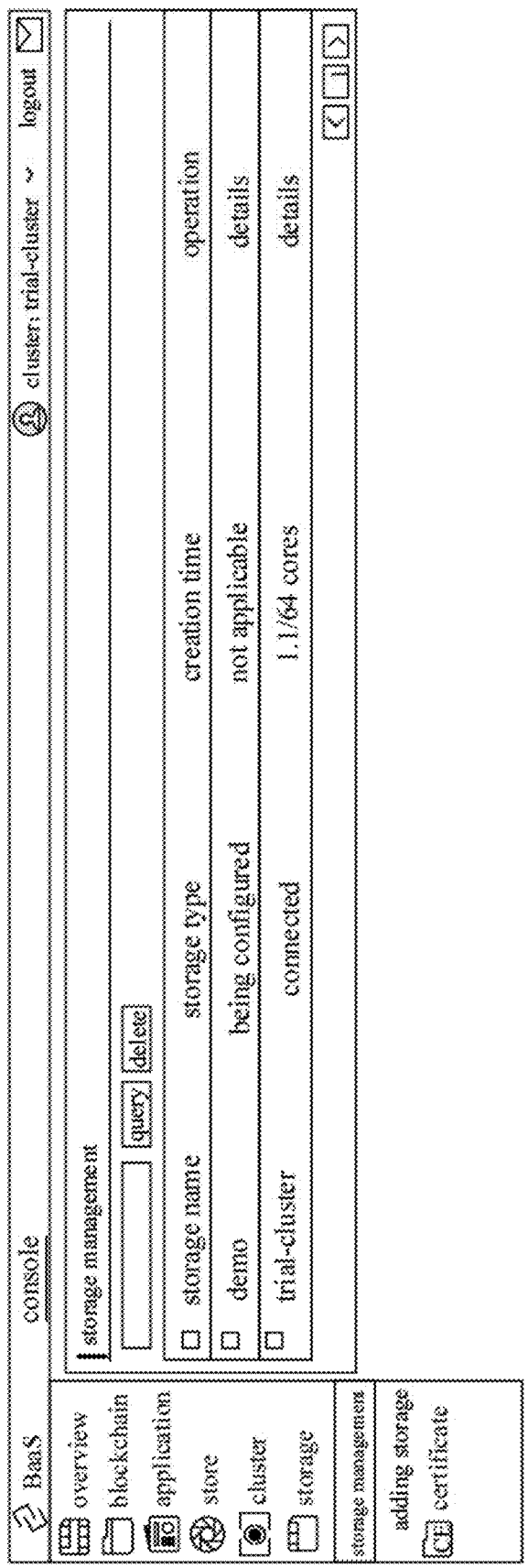
Figure 4G:
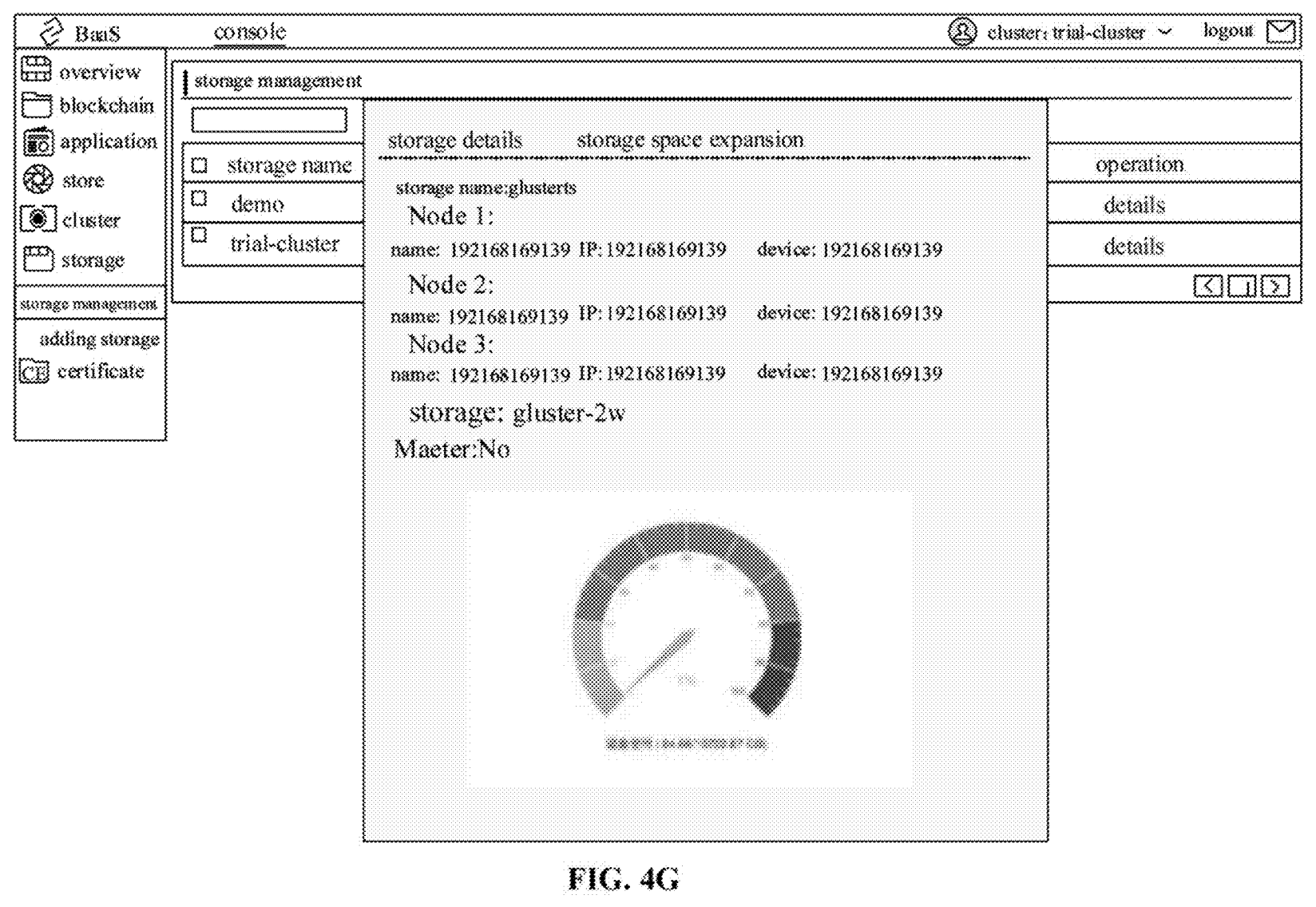
Figure 4H:
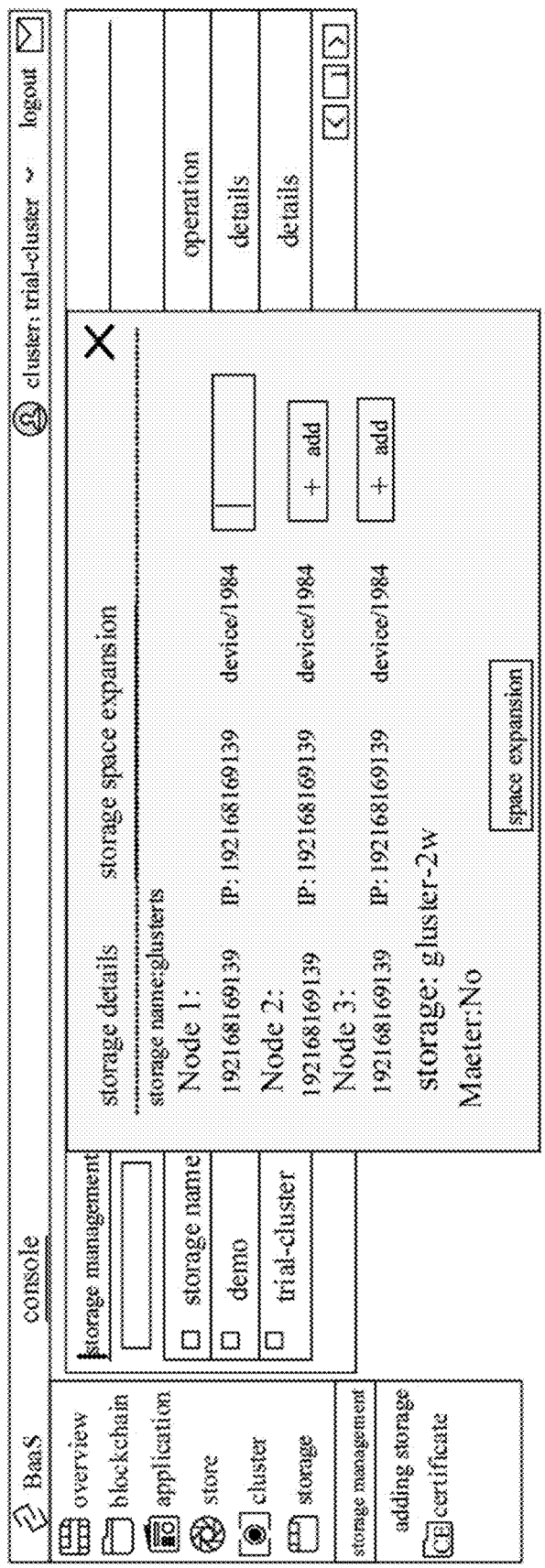
Figure 4J:
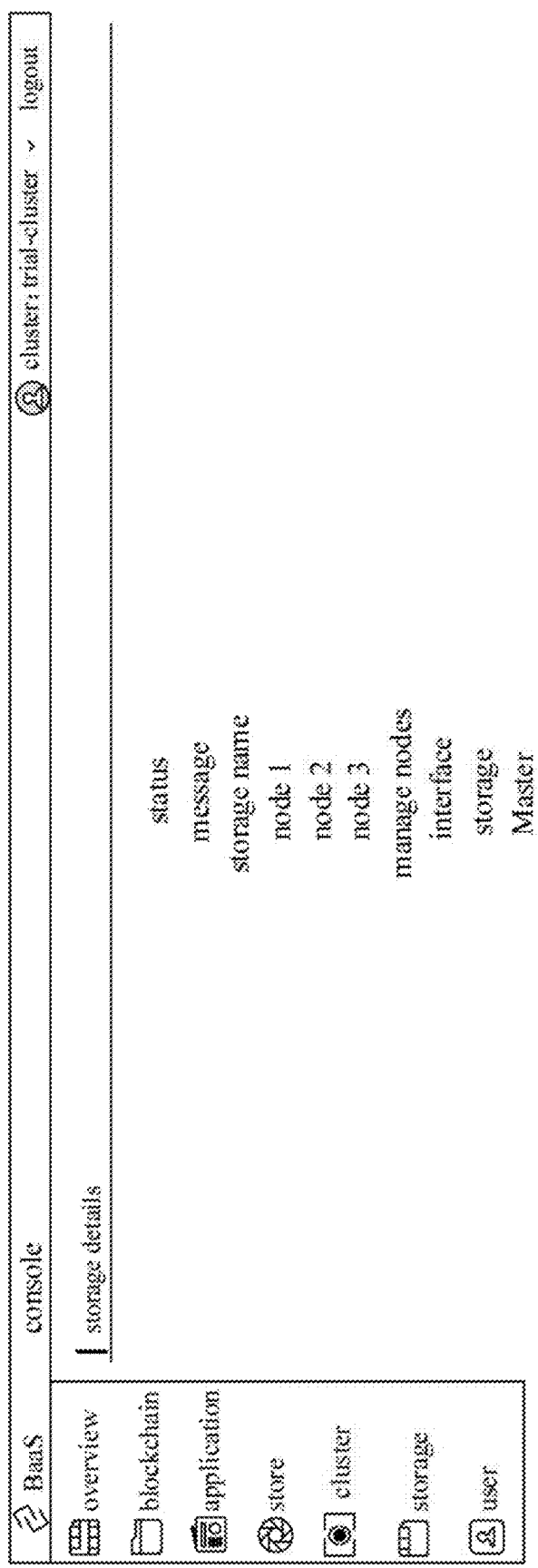
Figure 4K:
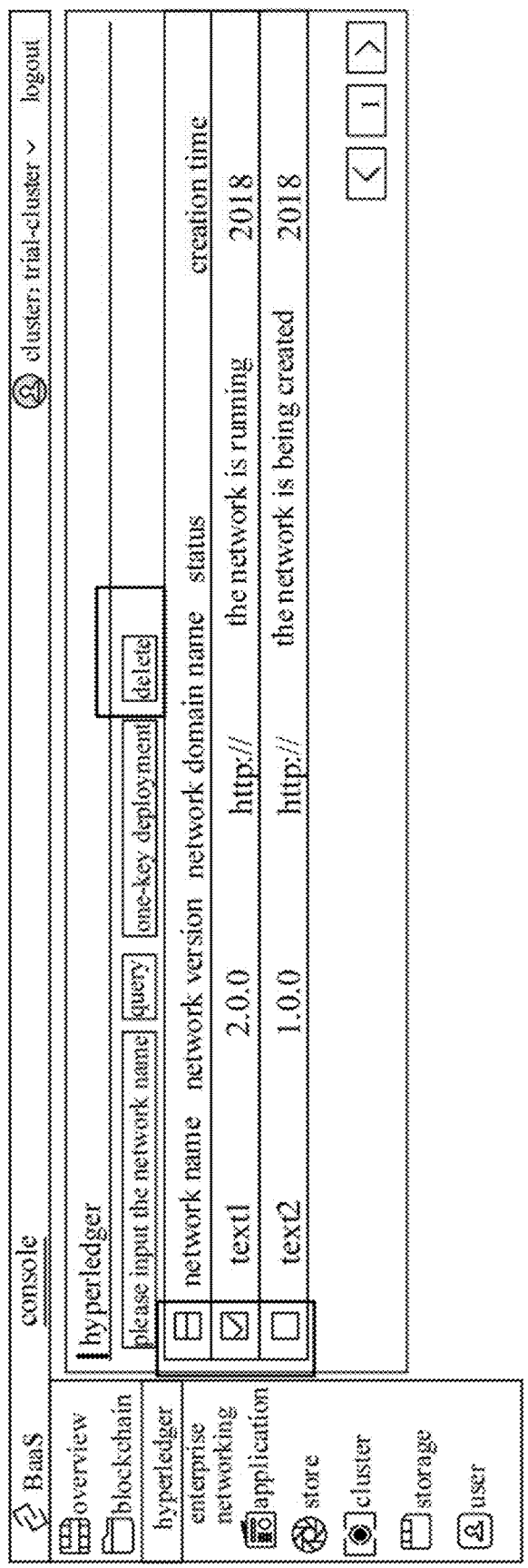
Figure 4L:
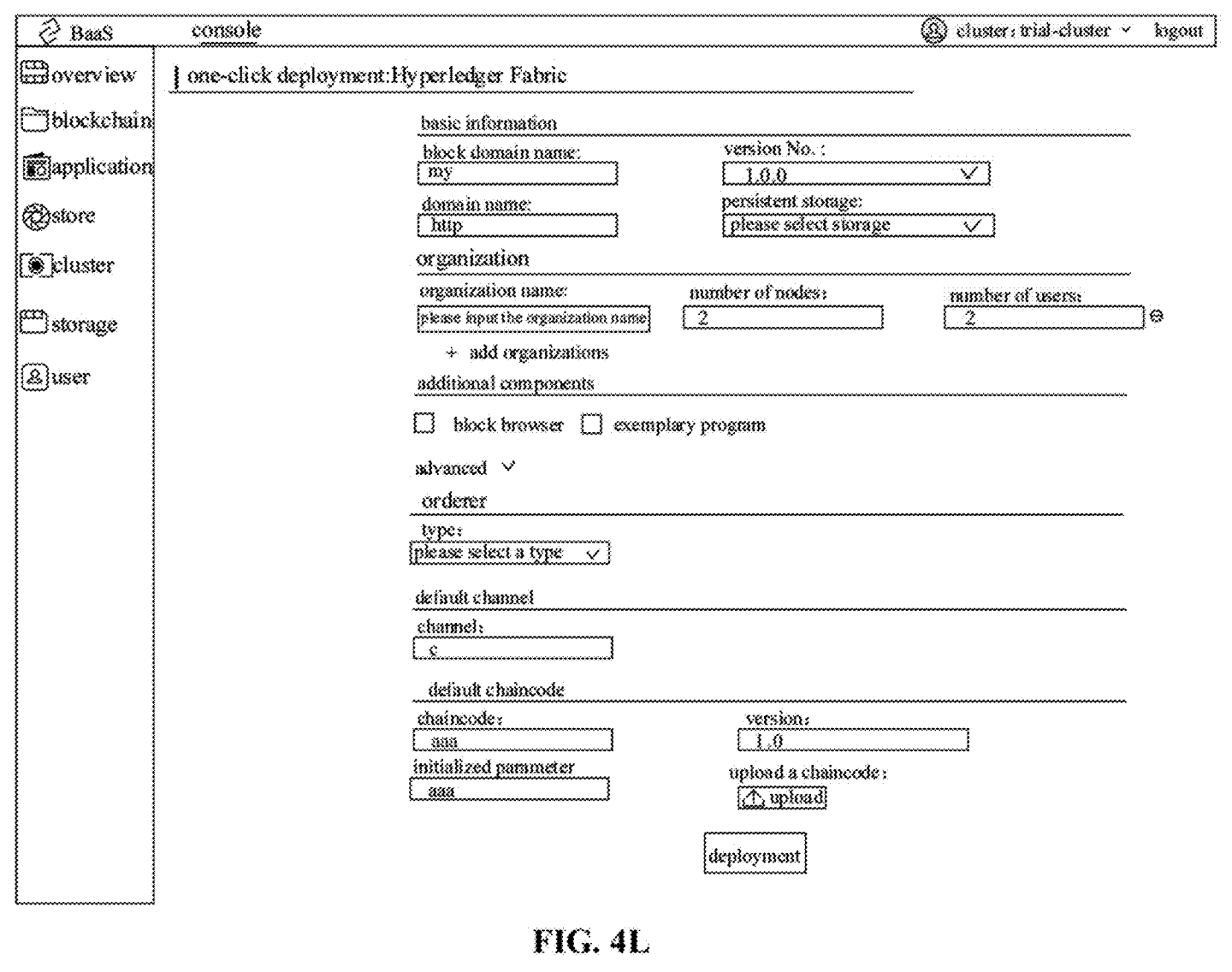
Figure 4M:
Figure 4O:
Figure 4P:
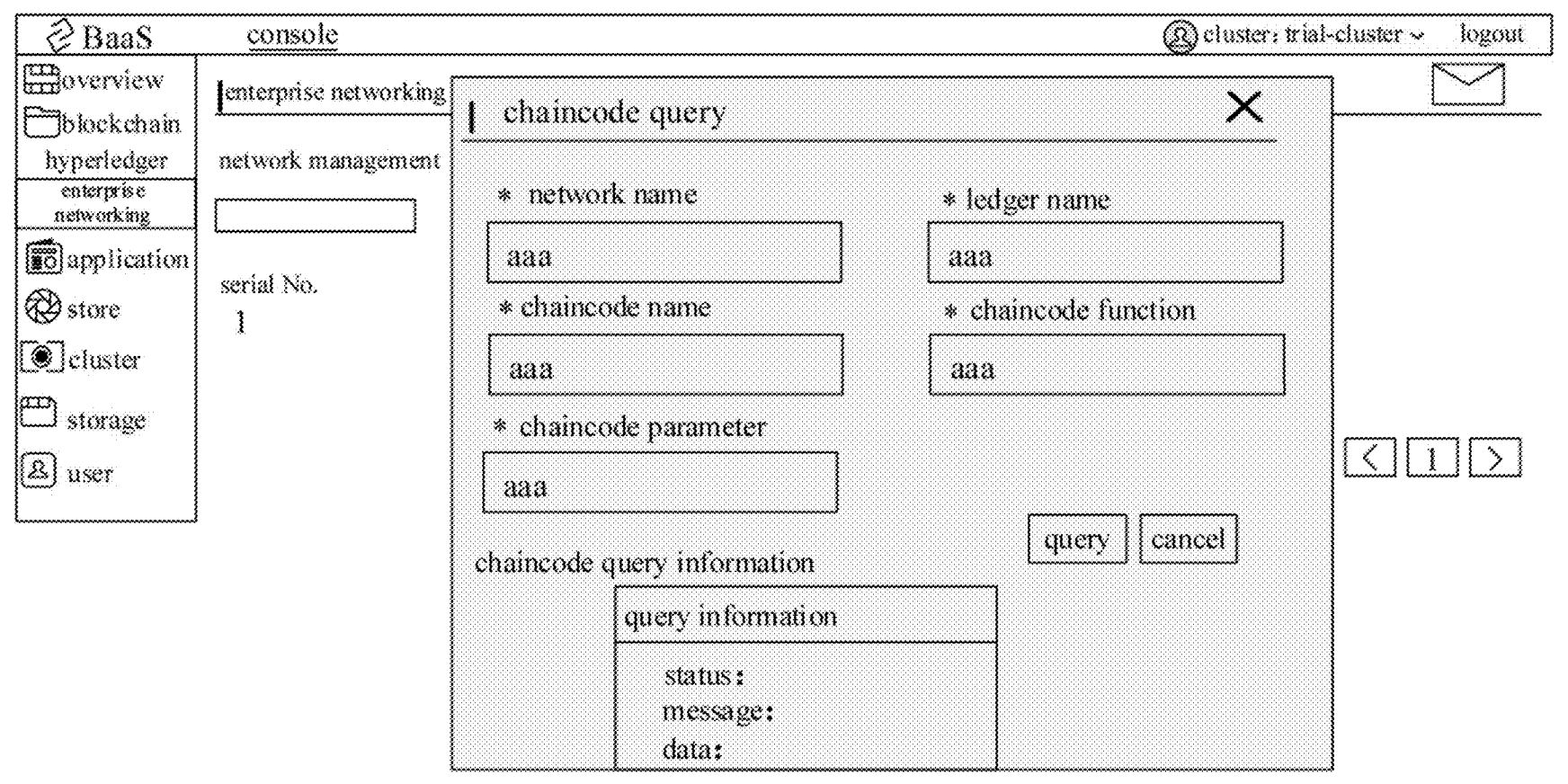
Figure 4Q:
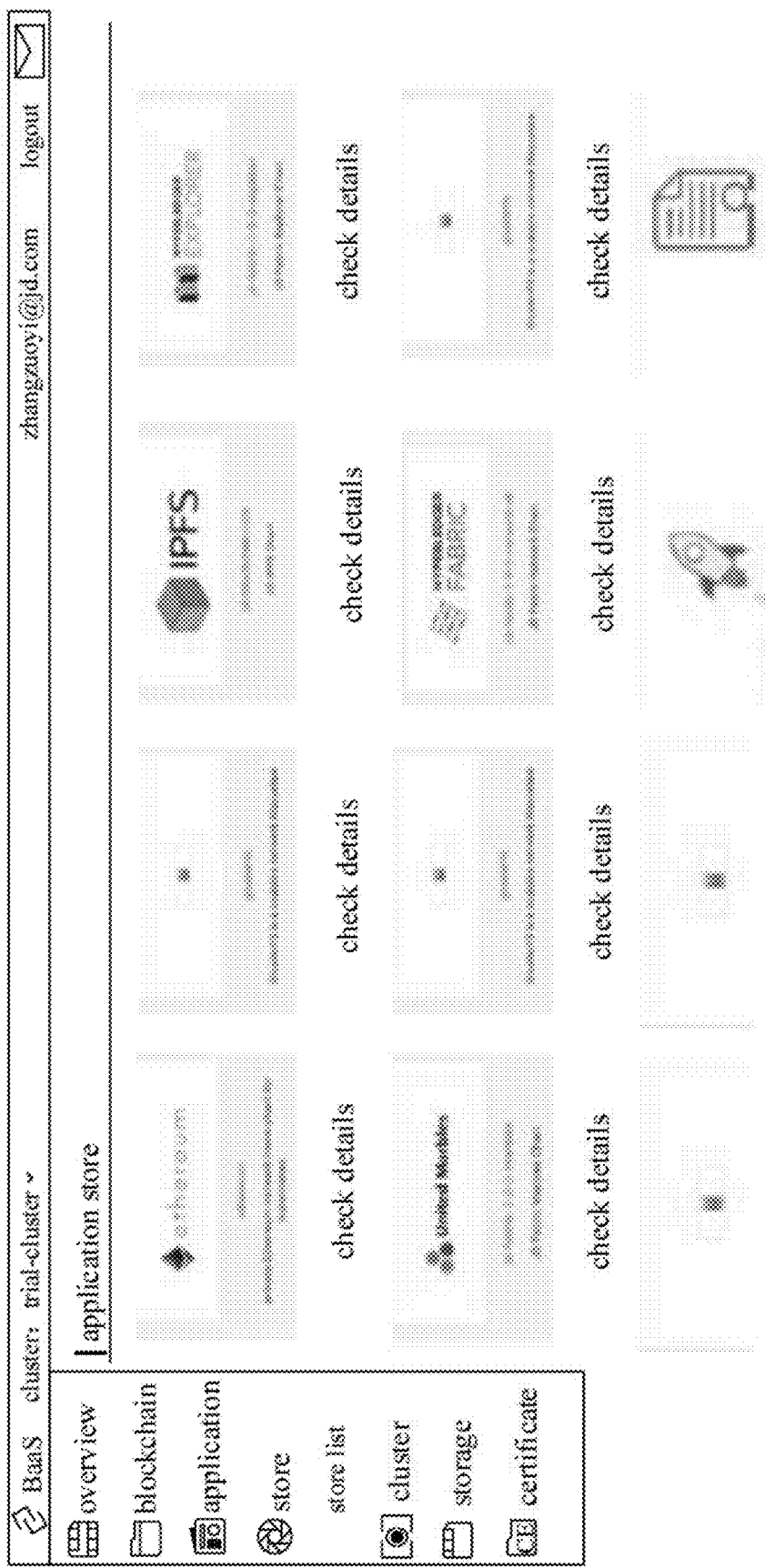

FIGS. 4A to 4Q are diagrams showing various function management pages of a blockchain network service platform according to an embodiment of the present disclosure. The function management page displayed in the graphical interface 310 of the developer terminal 300 as shown in FIG. 3 will be explained with reference to FIGS. 4A to 4Q.

FIG. 4A shows a status view page of the blockchain network service platform 100. On the status view page, an operating status of the blockchain network, such as CPU usage, memory usage, resource (node) usage, is displayed.

FIG. 4B shows a console page for a one-click deployment of the blockchain network service platform 100. The console page for the one-click deployment supports the developer to set basic information (including a block domain name, a version number) and organization (including an organization name, a number of nodes, a number of users, etc.) of the blockchain network, and uses default values to set advanced options, including sort node type, channel name, chaincode name, etc.

FIG. 4C shows a console page for resource management of the resource layer 105 of the blockchain network service platform 100. On the console page for the resource management, information about a cluster that can be deployed by the developer through the blockchain network service platform 100 is displayed, including a status of whether it is connected, CPU/memory usage, or the like.

In FIG. 4D, there is support for adding a container cluster for supporting the deblockchain network in, and entering a cluster name; and entering the creation page after the function option for creating the cluster are triggered.

FIG. 4E shows a console page of query cluster of the blockchain network service platform 100. When a function button of the query cluster is triggered, the system enters into a cluster list page, which supports the operations of adding a cluster, querying a cluster, deleting a cluster, and editing a cluster.

FIG. 4F shows a console page of storage management of the blockchain network service platform 100. When a function button of the storage management is triggered, the system enters into a storage management list page, which displays storage items that have been created in the cluster, including storage query and deletion functions.

FIG. 4G shows a console page of storage details of the blockchain network service platform 100, and FIG. 4H shows the storage details and supports dynamic storage space expansion for the storage.

FIG. 4I shows a console page for adding storage of the blockchain network service platform 100. The console page for adding the storage supports setting of added storage name and node, adding a node to the container cluster according to the setting, and displaying in FIG. 4J detailed information (including a node list of the container cluster) after adding the storage.

FIG. 4K shows a console page of a hyperledger of the blockchain network service platform 100, showing the name, network version, status, and creation time of the hyperledger used to deploy the blockchain network.

FIG. 4L shows a console page for one-click deployment of the hyperledger of the blockchain network service platform 100. The console page for the one-click deployment of the hyperledger provides configuration items for basic information of the deployment of the hyperledger and advanced configuration items using default values, such as a type of orderers, a channel, a default chaincode, and an initialization parameter.

FIGS. 4M and 4N show a console page for uploading % installing a chaincode of the blockchain network service platform 100. On the console page for uploading the chaincode, there are provided configuration items of a chaincode name and a version number. On the console page for installing the chaincode, there is provided a configuration item of a Chaincode version, the initialization parameter, organization, and a node.

FIG. 4O shows a console page of network details of the blockchain network service platform 100. The console page of the network details supports viewing of information such as an organization member, a block height, a number of transactions, and a number of contracts of different channels, and displays information such as an organization name of the viewed channel, a node name in the channel, and a chaincode name in the channel.

FIG. 4P shows a console page of chaincode query of the blockchain network service platform 100. On the console page of chaincode query, it is supported to use a network name, a chaincode name, as chaincode parameter, a ledger name, and a chaincode function to cooperate with the chaincode query. A dimension of the query includes status, message, and data.

FIG. 4Q shows a console page of an application store of the blockchain network service platform 100. The console page of the application store supports the developer in selecting the application to be deployed. Once an application is determined to be deployed to the blockchain network, rapid deployment of the container cluster to the resource layer 105 will be accomplished by reusing a mirror of the application.

Figure 5:
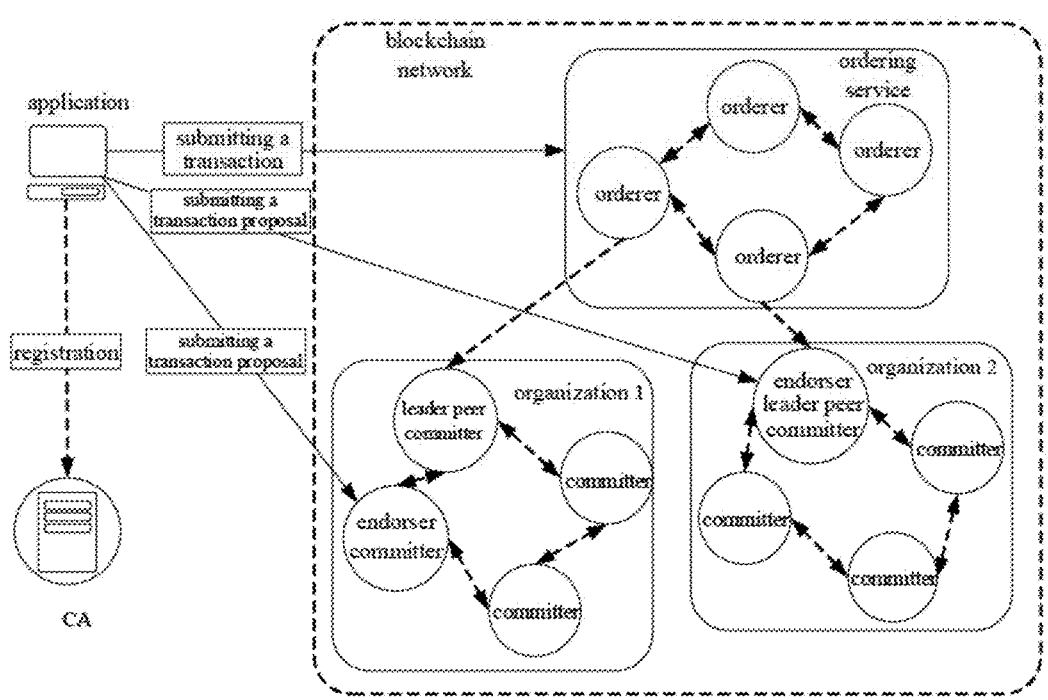
FIG. 5 is a schematic structural diagram of an exemplary blockchain network deployed using a blockchain network service platform according to an embodiment of the present disclosure.

FIG. 5 is a schematic structural diagram of an exemplary blockchain network deployed using a blockchain network service platform according to an embodiment of the present disclosure. An application program obtains a valid identity certificate from a CA to join an application channel within the network. Before initiating a formal transaction, a transaction proposal needs to be constructed and submitted to an endorser in organization 1 and organization 2 for endorsement. After a client collects sufficient (a corresponding number depends on an endorsement policy) endorsement support, the endorsement may be used to construct a legal transaction request (carrying the endorsement of the endorser). The legal transaction request may be sent to an orderer) in a ordering service for ranking so as to encapsulate the transaction into a block.

Figure 6:
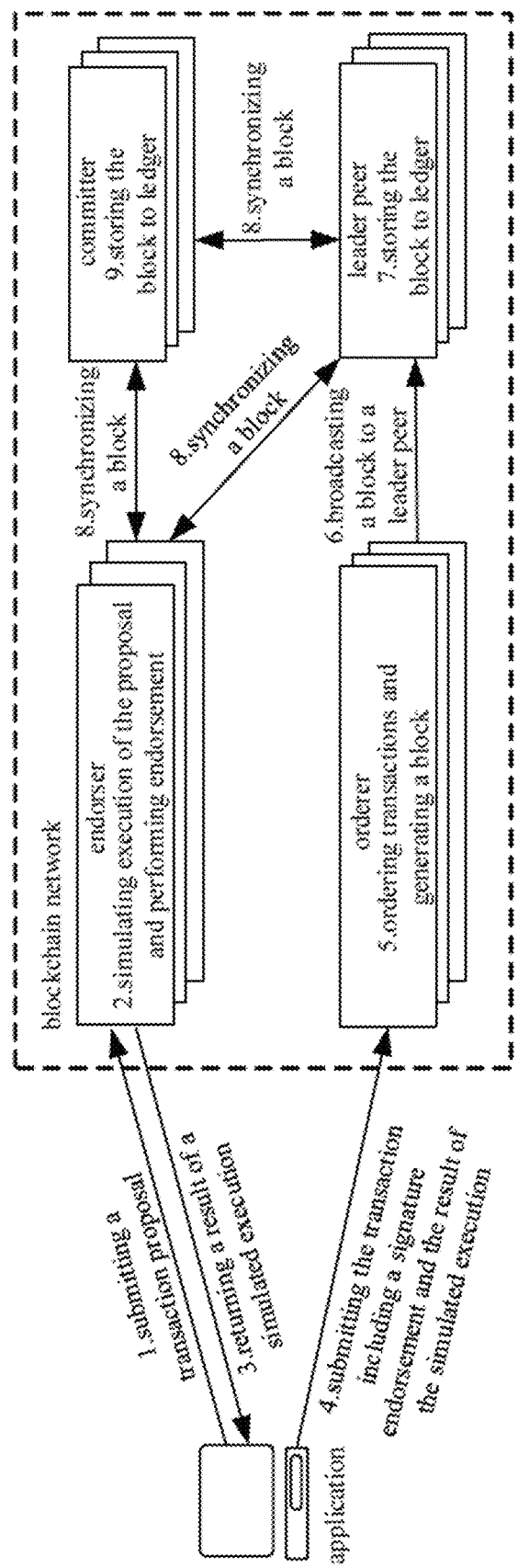
FIG. 6 is a flowchart of an exemplary transaction using a blockchain network service platform according to an embodiment of the present disclosure.

FIG. 6 is a flowchart of an exemplary transaction using a blockchain network service platform according to an embodiment of the present disclosure, wherein functions of a client and respective nodes in the transaction flow are as follows.

A client (application) uses an SDK to interact with a blockchain network. Firstly, the client obtains a valid identity certificate from a certificate authority (CA) to join an application channel within the network. Before initiating a formal transaction, a transaction proposal needs to be constructed and submitted to an endorser for endorsement. After the client collects sufficient (a corresponding number depends on an endorsement policy) endorsement support, the endorsement may be used to construct a legal transaction request (carrying the endorsement of the endorser). The legal transaction request may be sent to an orderer in a ordering service for ranking so as to encapsulate the transaction into a block. The client may also monitor messages in the network through an event mechanism to learn whether the transaction is successfully received.

The endorser mainly provides a method for the client to invoke, so as to finish an endorsement (signature) processing of the transaction proposal. After receiving the transaction proposal from the client, the endorser firstly check validity and an access Authority of a Control List (ACL). If passing the check, running the transaction is simulated, in which the chaincode name and parameter required to be executed are executed. The running the transaction is essentially executing the chaincode specified in the transaction. A state change caused by the transaction (recorded in the form of a read and write set, including the key and version of a read state, and the key value of a written state) is endorsed (that is, digitally signed), and a result of whether the transaction is supported is returned to the client.

An orderer receives a transaction including an endorsement signature, ranks unpackaged transactions, generates a block, and broadcasts the block to a Peer node.

A leader peer is a node communicating with the orderer and is responsible for obtaining the latest block from the ranking node and synchronizing it within the blockchain network.

The committer maintains the structure of the blockchain and ledger, including a Status Decibels (DB), a history DB, an index DB, etc. The node periodically acquires ranked bulk transactions block structure from the orderer, and checks the transactions (including a transaction message structure, signature integrity, whether it is repeated, whether versions of the read and write set match, etc.). If the check is passed, a legal transaction is executed, the result is written into the ledger, and a new block is constructed.

It is to be noted that all Peer nodes are committers and are responsible for verifying transactions in orderer blocks, maintaining status data and replication of ledgers. A portion of the Peer nodes will execute the transactions and sign the result, acting as an endorser. The endorser is a dynamic role and is bound to a specific chaincode. Each chaincode in a chaincode container sets an endorsement policy at the time of instantiation, specifying which nodes are valid after transaction endorsement. The Peer node is the endorser only when an application initiates a transaction endorsement request to it, and is a common committer which is only responsible for verifying the transaction and ledger in other time.

With the development of computer technology, the electronic products used by users are more and more diversified, and various data is generated by using the diversified electronic products, so that storage and protection requirements of the users for personal data are higher and higher. At present, blockchain systems are commonly used to manage, store, and retrieve the massive data.

For a file having a large amount of data, the existing blockchain storage and retrieval mode usually sends the file to a server, splits the file into a plurality of sub-files at the server, further encrypts the plurality of sub-files, stores the encrypted sub-files, obtains and decrypts all the sub-files through the server when the user downloads the file, then merges all the sub-files into a file having a large amount of data, and then returns the file to the terminal. It can be seen that the existing blockchain storage method is not only low in encryption efficiency and security, but also causes excessive pressure on the server, and cannot meet the storage requirements of the file having a large amount of data.

In order to solve the problems in the existing file storage mechanism, an embodiment of the present disclosure provides a file storage method in which a terminal splits a to-be-stored file and uploads it to an IPFS, generates an address set according to the addresses corresponding to a plurality of sub-files returned by the IPFS, encrypts the address set, and further stores an address set ciphertext to a blockchain network. It not only overcomes, to a large extent, the defects of excessive pressure on the server side caused by the existing file storage methods, but also reduces the amount of stored data, provides efficient encryption and high file storage security, greatly meeting the storage requirements of files having a large amount of data.

The following describes the technical solutions of an embodiment of the present disclosure clearly and completely with reference to the accompanying drawings in the embodiments of the present disclosure.

Figure 7:
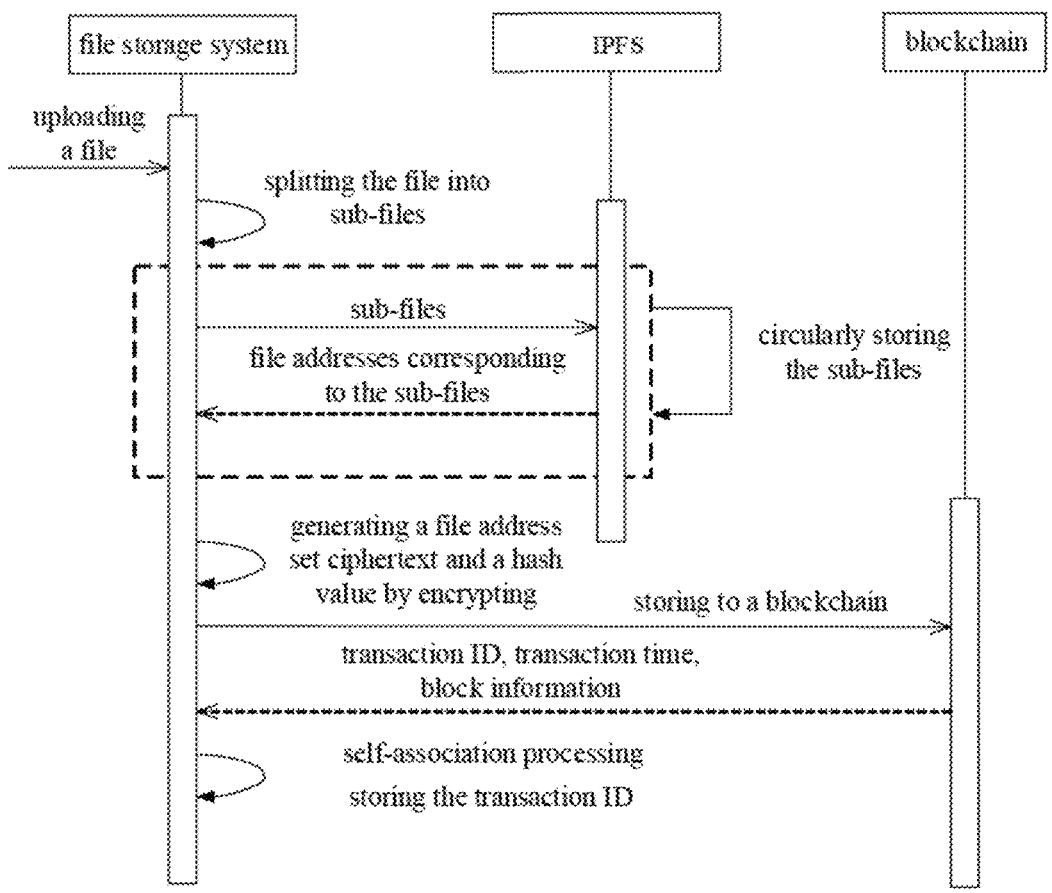
FIG. 7 is a first schematic diagram of an implementation of a file storage method according to an embodiment of the present disclosure.

An embodiment of the present disclosure provides a file storage method. The file storage method is applied to a file storage system. The file storage system is integrated into a terminal. FIG. 7 is a first schematic diagram of an implementation of a file storage method according to an embodiment of the present disclosure. After obtaining the file uploaded by a user, the file storage system splits the file to obtain a plurality of sub-files, circularly stores the splitted sub-files to the IPFS, receives file addresses corresponding to the plurality of sub-files returned by the IPFS, encrypts a file address set generated according to the plurality of file addresses to generate a file address set ciphertext, generates a hash value corresponding to the file address set ciphertext, stores the file address set ciphertext and the hash value to a blockchain, receives a transaction identity document (ID), transaction time, block information, or the like returned by the blockchain, and stores the transaction ID after self-association processing.

Figure 8:
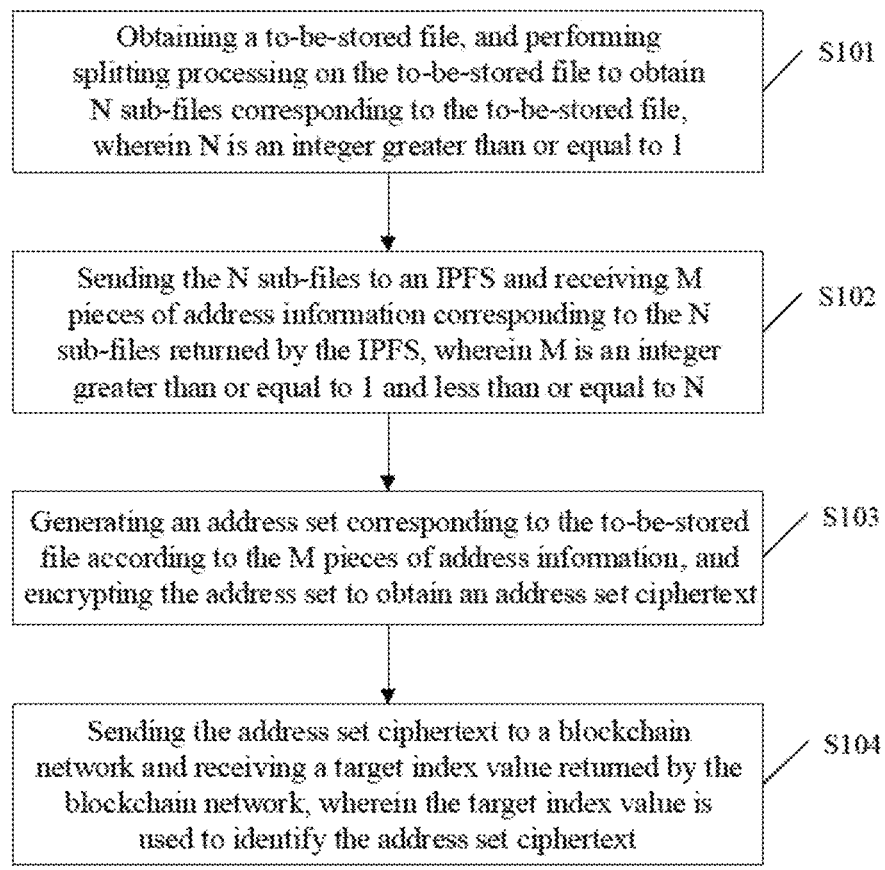
FIG. 8 is a first schematic flowchart of an implementation of a file storage method according to an embodiment of the present disclosure.

FIG. 8 is a first schematic flowchart of an implementation of a file storage method according to an embodiment of the present disclosure. As shown in FIG. 8, in the embodiment of the present disclosure, the file storage method performed by the terminal may include the following operations.

In operation 101, a to-be-stored file is obtained, and splitting processing is performed on the to-be-stored file to obtain N sub-files corresponding to the to-be-stored file. Here, N is an integer greater than or equal to 1.

In an embodiment of the present disclosure, when a user needs to store a file, the terminal may obtain the to-be-stored file, and perform the splitting processing on the to-be-stored file to obtain the N sub-files corresponding to the to-be-stored file. Here, N is an integer greater than or equal to 1.

It is to be noted that, in an embodiment of the present disclosure, the terminal may be any device having communication and storage functions, for example, a tablet computer, a mobile phone, an electronic reader, a Personal Computer (PC), a notebook computer, a vehicle-mounted device, a network television, or the like.

It is to be noted that, in an embodiment of the present disclosure, the to-be-stored file may be a video file, an audio file, a compressed file, or another type of file. That is, the file type of the to-be-stored file may include a document (Word) format, a Portable Document Format (PDF), a picture format (Joint Photographic Experts Group, JPG), a Portable Network Graphic (PNG), a video, and a voice, which is not limited in the present disclosure.

It is to be noted that in the embodiment of the present disclosure, after the terminal obtains the to-be-stored file, a size of each sub-file can be adaptively adjusted in the process of splitting the to-be-stored file to obtain the N sub-files. Specifically, the terminal may perform splitting processing on the to-be-stored file by determining a byte or an instruction parameter corresponding to the to-be-stored file, so as to obtain the N sub-files corresponding to the to-be-stored file.

Accordingly, if the terminal splits the to-be-stored file in a byte splitting processing manner, the terminal may first acquire a number of bytes corresponding to the to-be-stored file, and further splits the to-be-stored file N equally into sub-files of the same byte size according to the number of bytes. The number of bytes corresponding to each sub-file may be preset by the terminal. For example, if the terminal presets the number of bytes corresponding to each sub-file as $1.536 \times 10^7$, and when the size of the obtained to-be-stored file is 300 M, the terminal can split the to-be-stored file into twenty sub-files according to the preset byte splitting processing manner.

Correspondingly, if the terminal splits the to-be-stored file in an instruction parameter splitting processing manner, the terminal may obtain an instruction parameter corresponding to the to-be-stored file. The instruction parameter may be a number of rows corresponding to the to-be-stored file. Since all the to-be-stored files are composed of corresponding program codes including a plurality of line feed identifiers, the terminal may further determine a number of lines corresponding to the to-be-stored files by identifying the line feed identifiers, then split the to-be-stored files according to the number of lines splitting processing mode, and further split the to-be-stored files into N equal sub-files of the same size. For example, if the terminal presets the number of rows corresponding to each sub-file as 1500, and when the terminal determines that the number of rows corresponding to the to-be-stored file is 30000 by identifying the line feed identifier corresponding to the to-be-stored file, the terminal may further split the to-be-stored file into twenty sub-files.

Further, in an embodiment of the present disclosure, after splitting the to-be-stored file into the N sub-files, the terminal may send the N sub-files to the IPFS so as to further obtain addresses information corresponding to the N sub-files.

In operation S102, the N sub-files is sent to the IPFS, and M pieces of address information corresponding to the N sub-files returned by the IPFS is received. M is an integer greater than or equal to 1 and less than or equal to N.

In an embodiment of the present disclosure, after obtaining the N sub-files corresponding to the to-be-stored file, which are generated through performing splitting processing on the to-be-stored file, the terminal sends the N sub-files to the IPFS, and receives the M pieces of address information corresponding to the N sub-files returned by the IPFS. M is an integer greater than or equal to 1 and less than or equal to N.

It is to be noted that in an embodiment of the present disclosure, after performing the splitting processing on the to-be-stored file to the obtain N sub-files, the N sub-files corresponding to the to-be-stored file are sent to the IPFS, and a storage chain of the IPFS performs identification processing on the N sub-files and allocates the N sub-files to M storage nodes such as a storage node A, a storage node B, and a storage node C. Since one storage node in the IPFS can correspondingly store at least one sub-file, and one storage node returns one piece of address information, the number of storage nodes is less than or equal to the number of sub-files corresponding to the to-be-stored file. Accordingly, the terminal sends the N sub-files to the IPFS and stores the N sub-files in the M storage nodes corresponding to the IPFS. After the storage is completed, the terminal receives M pieces of address information corresponding to the M storage nodes returned by the IPFS. Further, when the N sub-files corresponding to the to-be-stored file are sent to the IPFS, the sub-files may be sent in a single sequential transmission manner in which one certain sub-file is sent to one storage node and one piece of corresponding address information is returned, or may be sent in a specific broadcast manner.

For example, in an embodiment of the present disclosure, after the terminal splits the to-be-stored file having a size of 300 M into twenty sub-files each of which has a size of 15 M, the terminal sequentially sends the sub-files each having a size of 15 M to the IPFS. Each time one sub-file is sent to the IPFS, one piece of address information returned by the IPFS is received. The terminal sequentially receives twenty pieces of address information returned by the IPFS. That is, the sub-file A corresponds to the storage node A, i.e., address information A; the sub-file B corresponds to the storage node B, i.e., address information B. Alternatively, the terminal may first obtain the number of storage nodes corresponding to the IPFS, and determine the sending mode of the N sub-files according to the number of storage nodes corresponding to the IPFS. If the number of storage nodes corresponding to the IPFS obtained by the terminal is ten, the terminal sets the file size to be sent to the IPFS in a single time as 30 M, that is, the terminal may send two sub-files to the IPFS each time, that is, the IPFS may store the sub-files A and B to the one storage node A. After the PFS stores the two sub-files to one storage node, the terminal receives the address information a returned by the IPFS, and the terminal receives a total of ten pieces of address information corresponding to the to-be-stored file returned by the IPFS.

Further, after receiving the M pieces of address information corresponding to the N sub-files returned by the IPFS, the terminal may further generate the address set corresponding to the to-be-stored file and encrypts on the generated address set.

In operation S103, the address set corresponding to the to-be-stored file is generated according to the M pieces of address information, and the address set is encrypted to obtain the address set ciphertext.

In an embodiment of the present disclosure, after sending the N sub-files to the IPFS and receiving the M pieces of address information returned by the IPFS, the terminal generates the address set corresponding to the to-be-stored file according to the obtained M pieces of addresses, and encrypts the generated address set to further obtain the address set ciphertext.

It is to be noted that in an embodiment of the present disclosure, the terminal encrypts the address set corresponding to the to-be-stored file using a public key. Specifically, the terminal randomly generates an asymmetric key pair, and then encrypts the address set including the M pieces of address information corresponding to the to-be-stored file by using a public key in the asymmetric key pair to obtain the address set ciphertext.

It is to be noted that, in an embodiment of the present disclosure, the asymmetric key pair randomly generated by the terminal includes two things: One is the public key, the other is a private key, and the public key and the private key are a pair. If data is encrypted using the public key, only the corresponding private key can decrypt the encrypted data: if data is encrypted using the private key, only the corresponding public key can decrypt the encrypted data. Specifically, the private key can only be kept securely by one party and cannot be leaked, while the public key can be sent to any person requesting it. Accordingly, the terminal may perform asymmetric encryption using an RSA algorithm. The public key and the private key in the asymmetric key pair are generated simultaneously. The terminal uses the public key to encrypt the address set while storing the obtained private key, so that after the storage of the to-be-stored file is completed, the address set can be decrypted when the to-be-stored file is downloaded.

Further, in an embodiment of the present disclosure, after generating the address set corresponding to the to-be-stored file according to the M pieces of address information, and further encrypting the address set to obtain the address set ciphertext, the terminal may further store the address set ciphertext to a blockchain network.

Further, in an embodiment of the present disclosure, after the address set corresponding to the to-be-stored file is encrypted by the public key to obtain the address set ciphertext, the terminal may generate a hash value corresponding to the address set ciphertext through a hash operation, and further store the address set ciphertext and the hash value to the blockchain network.

In operation S104, the address set ciphertext is sent to the blockchain network, and a target index value returned by the blockchain network is received. The target index value is used to identify address set ciphertext.

In an embodiment of the present disclosure, after encrypting the address set corresponding to the to-be-stored file to obtain the address set ciphertext, the terminal may send the address set ciphertext to the blockchain network and receive the target index value returned by the blockchain network, wherein the target index value is used to identify the address set ciphertext.

It is to be noted that in an embodiment of the present disclosure, after sending the address set ciphertext corresponding to the to-be-stored file to the blockchain network, the terminal further stores the address set ciphertext in a block in the blockchain network, and the terminal may receive an transaction ID, transaction time, block information, or the like returned by the blockchain network. Specifically, after receiving the address set ciphertext sent by the terminal, the blockchain network stores the address set ciphertext into a block containing file information, and the blockchain network treats such storage event as a transaction. Since a plurality of different to-be-stored files correspond to different address set ciphertext, that is, to different transactions. Each block in the blockchain network may include a plurality of transactions. Therefore, in order to distinguish different transactions, that is, different address set ciphertext, after the address set ciphertext is stored, the terminal receives the transaction information corresponding to the address set ciphertext returned by the blockchain network, including the transaction ID, the transaction time, the block information, or the like. The transaction ID is the target index value, and the corresponding address set ciphertext can be found according to the target index value. The transaction time corresponds to time for sending and uploading the address set ciphertext, which is start time for the terminal to send the address set ciphertext to the blockchain network. The block information, that is, some information contained in the block storing the address set ciphertext, may be a block height, a block hash value, or the like.

It is to be noted that in an embodiment of the present disclosure, the terminal may send the address set ciphertext and the hash value corresponding to the address set ciphertext to the blockchain network, and receive the target index value corresponding to the hash value returned by the blockchain network.

Further, in an embodiment of the present disclosure, after storing the address set ciphertext and the hash value corresponding to the to-be-stored file in the blockchain to obtain the target index value returned by the blockchain, the terminal may further store the obtained target index value, so that when receiving a download request for downloading the to-be-stored file, the terminal may obtain the to-be-stored file through the target index value.

Figure 9:
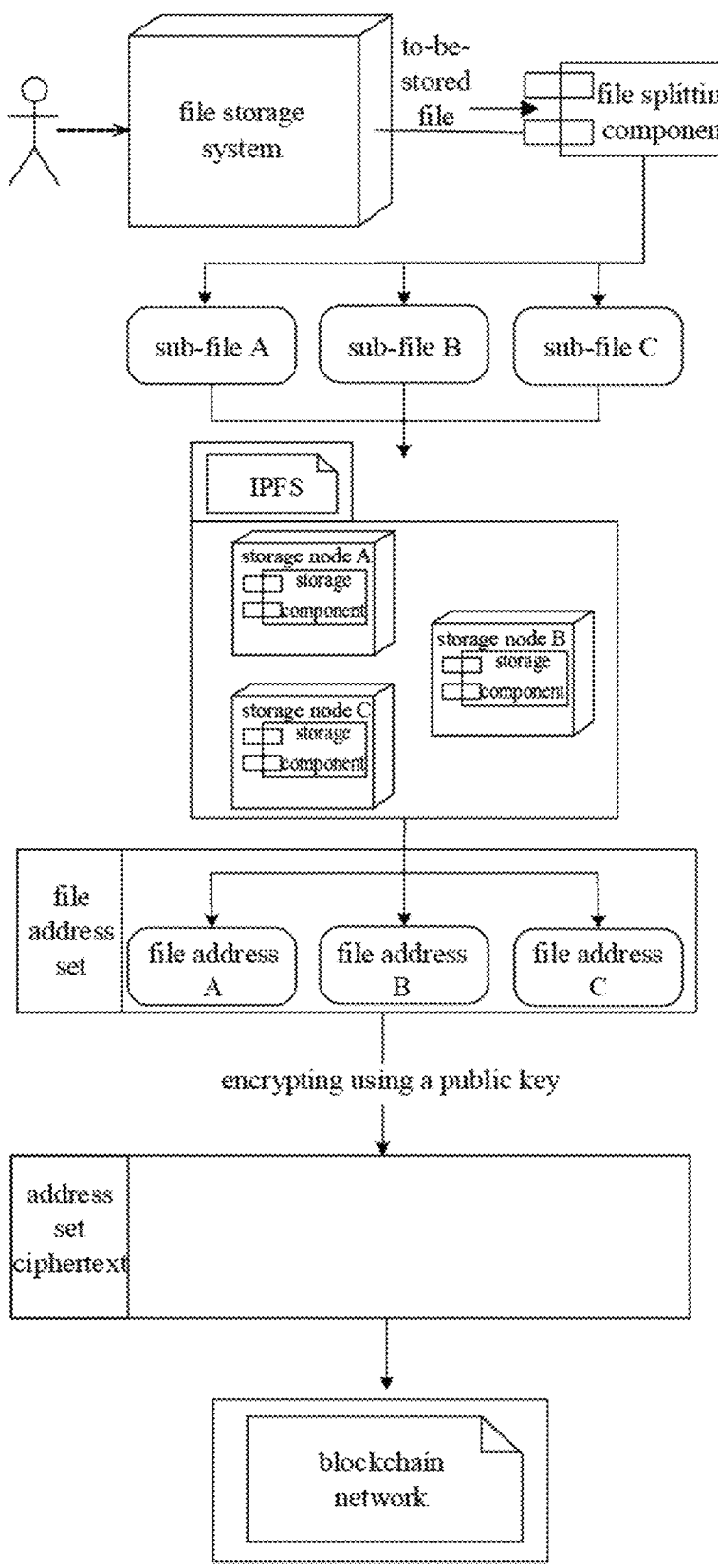
FIG. 9 is a schematic flowchart of an exemplary implementation of file storage according to an embodiment of the present disclosure.

FIG. 9 is a schematic flowchart of an exemplary implementation of file storage according to an embodiment of the present disclosure. The file storage system obtains a to-be-stored file uploaded by a user. The to-be-stored file is splitted into a sub-file A, a sub-file B, and a sub-file C by a file splitting component, and sends the splitted sub-files to an IPFS. The IPFS stores the three sub-files in a corresponding storage node A, a corresponding storage node B, and a corresponding storage node C through a storage component, and returns a file address A, a file address B, and a file address C corresponding to the three sub-files to the file storage system. After receiving the file addresses corresponding to the sub-files returned by the IPFS, the file storage system generates a file address set according to the file address A, the file address B, and the file address C.

Embodiments of the present disclosure provide a file storage method, terminal, and storage medium. The terminal obtains a to-be-stored file, performs splitting processing on the to-be-stored file to obtain N sub-files corresponding to the to-be-stored file, wherein N is an integer greater than or equal to 1. The terminal sends the N sub-files to the IPFS, and receives M pieces of address information corresponding to the N sub-files returned by the IPFS, wherein M is an integer greater than or equal to 1 and less than or equal to N. The terminal generates an address set corresponding to a to-be-stored file according to the M pieces of address information, and encrypts the address set to obtain an address set ciphertext, stores the address set ciphertext to the blockchain network and receives a target index value returned by the blockchain network, wherein the target index value is used to identify the address set ciphertext. That is, in an embodiment of the present disclosure, the terminal splits and uploads the to-be-stored file to the IPFS, generates the address set according to addresses corresponding to the plurality of sub-files returned by the received IPFS, encrypts the address set, and further stores the address set ciphertext to the blockchain network. It not only overcomes, to a large extent, the defects of excessive pressure on a server side caused by existing file storage methods, but also reduces the amount of stored data, provides efficient encryption and high file storage security, greatly meeting the storage requirements of files having a large amount of data.

Figure 10:
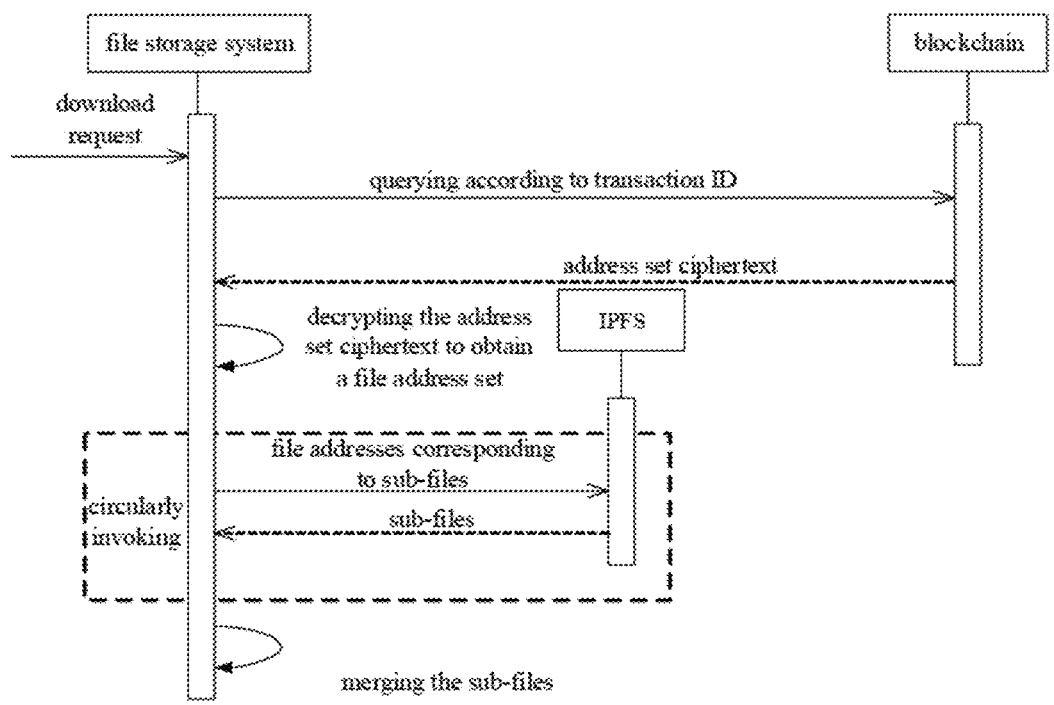
FIG. 10 is a second schematic diagram of implementation of a file storage method according to an embodiment of the present disclosure.

Based on the above embodiment, in another embodiment of the present disclosure, FIG. 10 is a second schematic diagram of implementation of a file storage method according to an embodiment of the present disclosure. The file storage system receives request information for downloading a file, that is, a download request, sends transaction IDs carried in the download request to a blockchain, receives an address set ciphertext returned by the blockchain, decrypts the address set ciphertext to obtain a file address set including a plurality of sub-file addresses, sends the file addresses corresponding to the plurality of sub-files to an IPFS, receives the plurality of sub-files corresponding to different file addresses returned by the IPFS, and further merges the plurality of sub-files.

Figure 11:
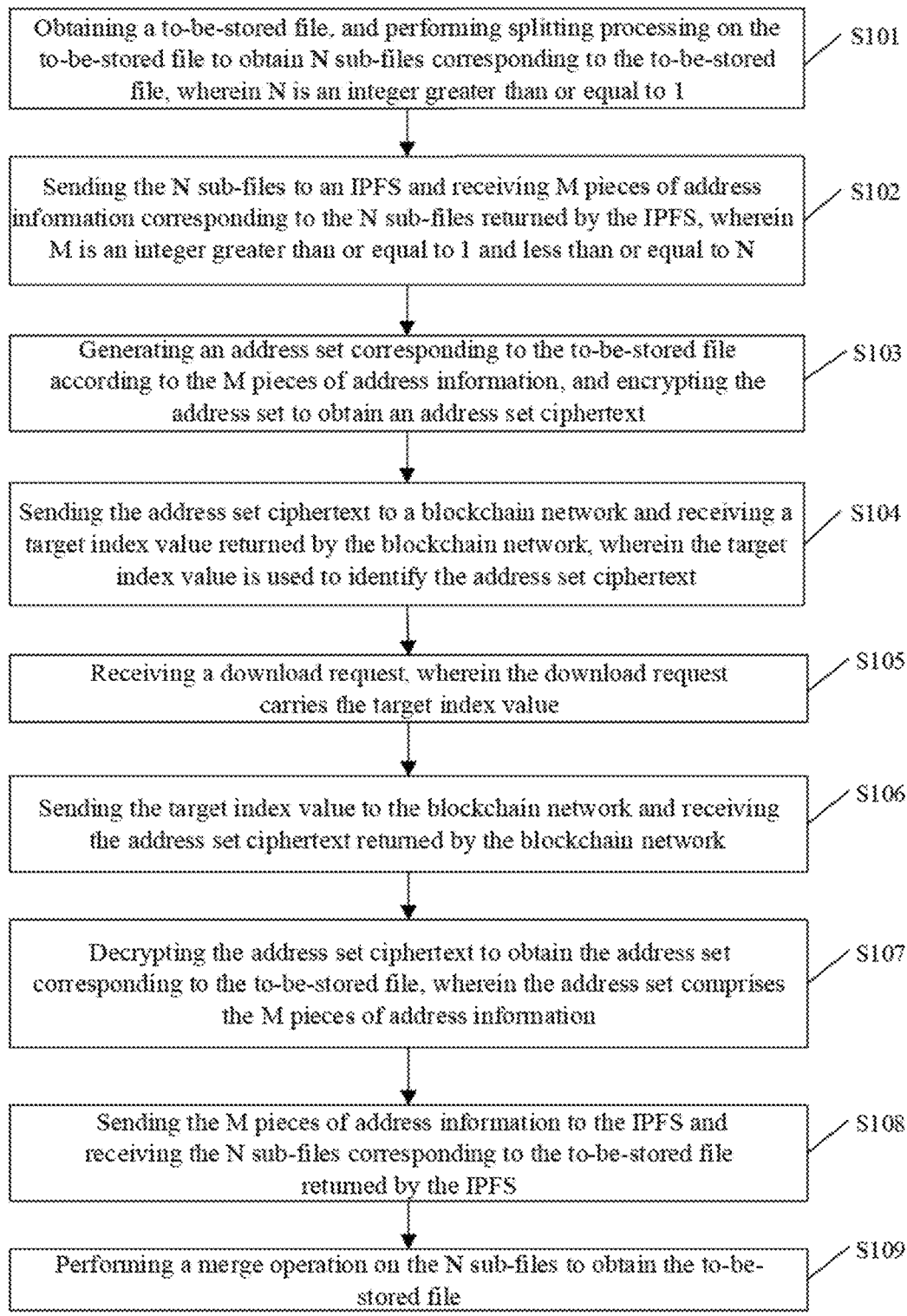
FIG. 11 is a second schematic flowchart of an implementation of a file storage method according to an embodiment of the present disclosure.

FIG. 11 is a second schematic flowchart of implementation of a file storage method according to an embodiment of the present disclosure. As shown in FIG. 11, after a terminal stores an address set ciphertext to a blockchain network and receives a target index value returned by the blockchain network, that is, after the operation S104, the method for storing a file performed by the terminal may further include the following operations.

In operation S105, a download request is received. The download request carries a target index value.

In an embodiment of the present disclosure, after the terminal sends the address set ciphertext to the blockchain network, receives the target index value returned by the blockchain network, and further stores the target index value, the terminal receives the download request, and information corresponding to the download request carries the target index value.

It is to be noted that in an embodiment of the present disclosure, the terminal receives the download request for downloading the to-be-stored file, and the information carried in the download request may include the target index value corresponding to the address set ciphertext, or may include the hash value corresponding to the address set ciphertext. If the information carried in the download request includes the target index value, the terminal may directly extract the address set ciphertext corresponding to the to-be-stored file from the blockchain through the target index value. If the information carried in the download request includes the hash value corresponding to the address set ciphertext, the target index value corresponding to the hash value is generated when the address set ciphertext corresponding to the to-be-stored file and the hash value corresponding to the address set ciphertext are stored in the blockchain network. Therefore, when the terminal needs to extract the address set ciphertext corresponding to the to-be-stored file from the blockchain network after receiving the download request, the terminal may first determine the target index value according to the hash value corresponding to the address set ciphertext carried in the download request, and further extract the address set ciphertext corresponding to the to-be-stored file from the blockchain network according to the target index value.

Further, after receiving the download request carrying the target index value, the terminal may send the target index value to the blockchain network to obtain the address set ciphertext corresponding to the to-be-stored file.

In operation S106, the target index value is sent to the blockchain network, and the address set ciphertext returned by the blockchain network is received.

In an embodiment of the present disclosure, after receiving the download request sent by a user and obtaining the target index value carried in the download request, the terminal may send the target index value to the blockchain network, and further receive the address set ciphertext corresponding to the to-be-stored file returned by the blockchain.

It is to be noted that, in an embodiment of the present disclosure, after the to-be-stored file is stored in the blockchain network, the terminal receives an index value returned by the blockchain network for obtaining the address set ciphertext. Therefore, when downloading the to-be-stored file, the terminal may send the target index value corresponding to the address set ciphertext carried in the download request to the blockchain network, and further extract the address set ciphertext corresponding to the to-be-stored file from the block of the blockchain network that stores field information according to the index value. Specifically, after receiving the target index value sent by the terminal, a block link performs matching search according to the target index value, and sends the retrieved address set ciphertext corresponding to the target index value to the terminal. The terminal obtains the address set ciphertext corresponding to the to-be-stored file.

Further, after receiving the address set ciphertext corresponding to the to-be-stored file returned by the blockchain, the terminal may further decrypt the address set ciphertext.

In operation S107, the address set ciphertext is decrypted to obtain the address set corresponding to the to-be-stored file. The address set may include the M pieces of address information.

In an embodiment of the present disclosure, after receiving the address set ciphertext corresponding to the to-be-stored file returned by the blockchain network, the terminal may decrypt the obtained address set ciphertext to further obtain the address set corresponding to the to-be-stored file. The address set includes the M pieces of address information.

It is to be noted that in an embodiment of the present disclosure, the terminal decrypt the address set ciphertext corresponding to the to-be-stored file by using the private key, so as to obtain the address set corresponding to the to-be-stored file and including the M pieces of address information. Since the public key in the asymmetric secret key pair is used to encrypt the address set when the to-be-stored file is stored, and the public key and the private key are a pair, the data encrypted using the public key can only be decrypted using the corresponding private key. Therefore, the terminal can decrypt the address set ciphertext only by using the private key, and further obtain the address set corresponding to the to-be-stored file.

Further, in the embodiment of the present disclosure, after obtaining the address set corresponding to the to-be-stored file including the M pieces of address information, the terminal may send the M pieces of address information to the IPFS to further obtain the N sub-files corresponding to the to-be-stored file.

In operation S108, the M pieces of address information is sent to the IPFS, and the N sub-files corresponding to the to-be-stored file returned by the IPFS is received.

In an embodiment of the present disclosure, after decrypting the address set ciphertext and obtaining the address set corresponding to the to-be-stored file including the M pieces of address information, the terminal sends the M pieces of address information to the IPFS, and further receives the N sub-files corresponding to the to-be-stored file returned by the IPFS.

It is to be noted that in an embodiment of the present disclosure, after obtaining the address set corresponding to the to-be-stored file, the terminal sends the M pieces of address information included in the address set to the IPFS, and further receives the N sub-files returned by M storage nodes in the IPFS. Specifically, the terminal may send address information A and then receive a sub-file A returned by the IPFS, or the terminal may send the address information A and receive the sub-file A and a sub-file B returned by the IPFS.

Further, in an embodiment of the present disclosure, after receiving the N sub-files corresponding to the to-be-stored file retuned by the IPFS, the terminal may further merge the N sub-files to obtain the to-be-stored file.

In operation 109, a merge operation is performed on the N sub-files to obtain the to-be-stored file.

In an embodiment of the present disclosure, after sending the M pieces of address information to the IPFS and receiving the N sub-files corresponding to the to-be-stored file returned by the IPFS, the terminal further performs the merge operation on the N sub-files to obtain the to-be-stored file.

Figure 12:
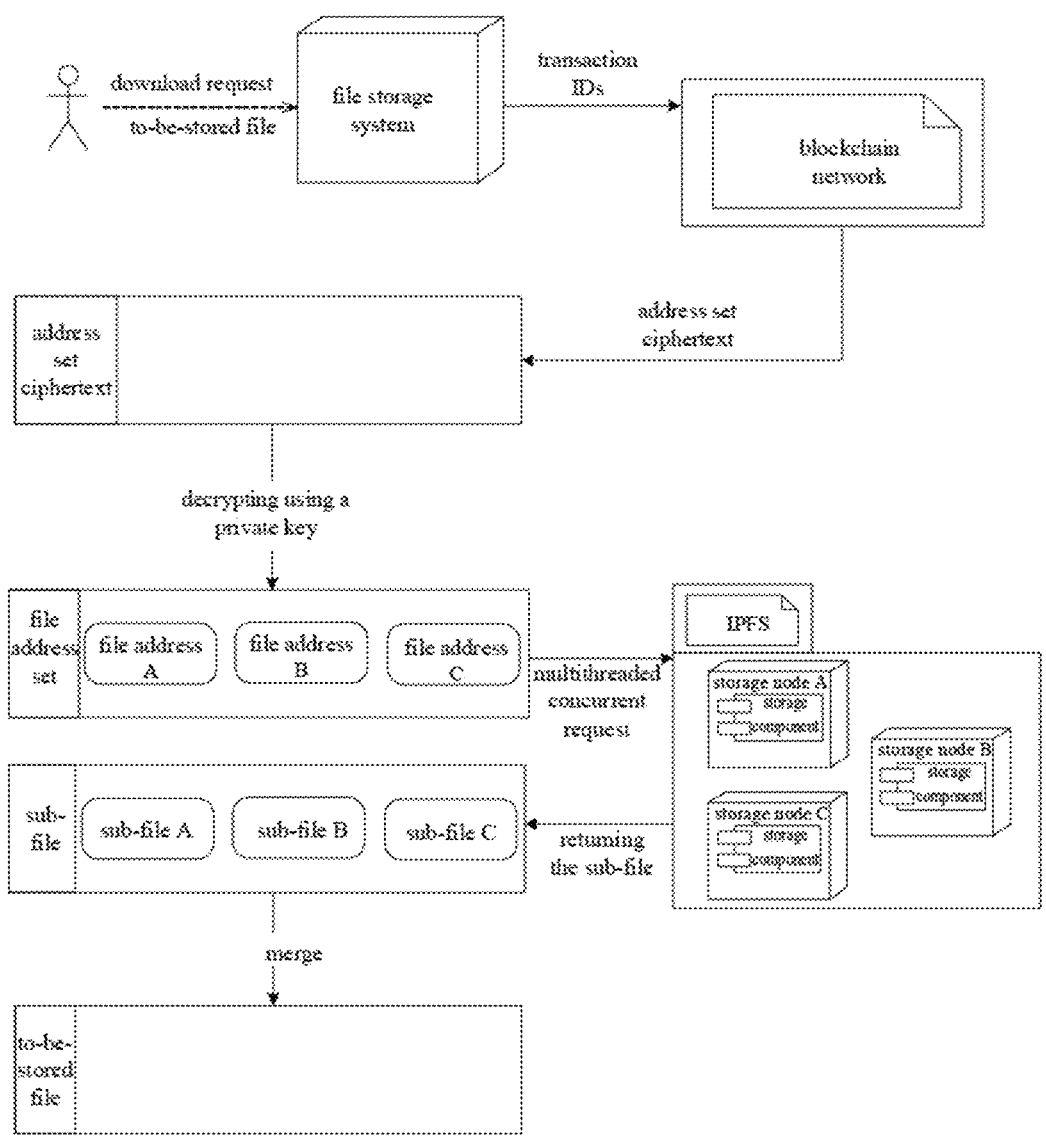
FIG. 12 is a schematic flowchart of an exemplary implementation of a file query according to an embodiment of the present disclosure.

FIG. 12 is a schematic flowchart of an exemplary implementation of a file query according to an embodiment of the present disclosure. A file storage system receives a download request for downloading a to-be-stored file. The download request carries transaction IDs. The file storage system sends the transaction IDs to a blockchain network. The blockchain network performs matching retrieval according to the transaction IDs, and sends address set ciphertext corresponding to the transaction IDs to the file storage system. The file storage system decrypting the address set ciphertext using a private key to obtain a file address set (including a file address A, a file address B, and a file address C), and then sends the file address set (including the file address A, the file address B, and the file address C) to the IPFS in a multithreaded concurrent request manner. The IPFS extracts corresponding sub-files A, B, and C from a storage node A, a storage node B, and a storage node C according to the received file address, and returns the sub-files to the file storage system. The file storage system merges the obtained sub-file A, sub-file B, and sub-file C to obtain a to-be-stored file.

Embodiments of the present disclosure provide a file storage method, terminal, and storage medium. The terminal obtains a to-be-stored file, and performs splitting processing on the to-be-stored file to obtain N sub-files corresponding to the to-be-stored file, wherein N is an integer greater than or equal to 1; sending the N sub-files to the IPFS and receiving M pieces of address information corresponding to the N sub-files returned by the IPFS, wherein M is an integer greater than or equal to 1 and less than or equal to N; generating an address set corresponding to the to-be-stored file according to the M pieces of address information, and encrypting the address set to obtain an address set ciphertext; storing the address set ciphertext to a blockchain network and receiving a target index value returned by the blockchain network, wherein the target index value is used to identify the address set ciphertext. That is, in the embodiment of the present disclosure, the terminal splits and uploads the to-be-stored file to the IPFS, generates the address set according to received addresses corresponding to a plurality of sub-files returned by the IPFS, encrypts the address set, and further stores the address set ciphertext to the blockchain network. It not only overcomes, to a large extent, the defects of excessive pressure on the server side caused by the existing file storage methods, but also reduces the amount of stored data, provides efficient encryption and high file storage security, greatly meeting the storage requirements of files having a large amount of data.

Figure 13:
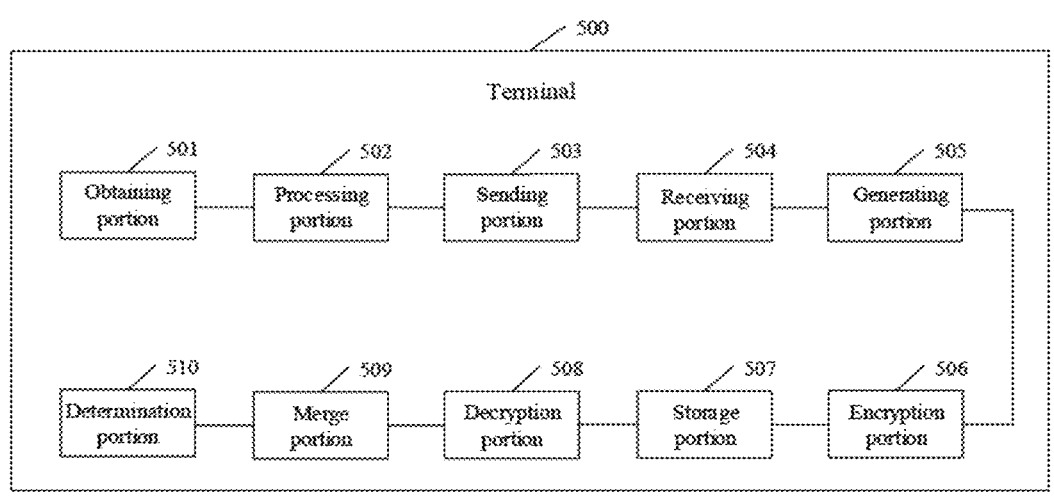
FIG. 13 is a first schematic structural diagram of a terminal according to an embodiment of the present disclosure.

Based on the above-described embodiment, in another embodiment of the present disclosure. FIG. 13 is a first schematic structural diagram of a terminal according to an embodiment of the present disclosure. As shown in FIG. 13, the terminal 500 proposed in the embodiment of the present disclosure may include an obtaining portion 501, a processing portion 502, a sending portion 503, a receiving portion 504, a generating portion 505, an encryption portion 506, a storage portion 507, a decryption portion 508, a merge portion 509, and a determination portion 510.

The obtaining portion 501 is configured to obtain a to-be-stored file.

The processing portion 502 is configured to perform splitting processing on the to-be-stored file to obtain N sub-files corresponding to the to-be-stored file. N is an integer greater than or equal to 1.

The sending portion 503 is configured to send the N sub-files to an IPFS.

The receiving portion 504 is configured to receive M pieces of address information corresponding to the N sub-files returned by the IPFS. M is an integer greater than or equal to 1 and less than or equal to N.

The generating portion 505 is configured to generate an address set corresponding to the to-be-stored file according to the M pieces of address information.

The encryption portion 506 is configured to encrypt the address set to obtain an address set ciphertext.

The sending portion 503 is further configured to send the address set ciphertext to a blockchain network.

The receiving portion 504 is further configured to receive a target index value returned by the blockchain network. The target index value is used to identify the address set ciphertext.

Further, in an embodiment of the present disclosure, the processing portion 502 is specifically configured to determine a number of bytes corresponding to the to-be-stored file, and split the to-be-stored file into the N sub-files according to the number of bytes.

Further, in an embodiment of the present disclosure, the processing portion 502 is further specifically configured to determine an instruction parameter corresponding to the to-be-stored file, and split the to-be-stored file into the N sub-files according to the instruction parameter.

Further, in an embodiment of the present disclosure, the encryption portion 506 is specifically configured to randomly generate an asymmetric key pair. The asymmetric key pair includes a public key and a private key. The encryption portion is configured to encrypt the address set corresponding to the to-be-stored file using the public key to obtain the address set ciphertext.

Further, in an embodiment of the present disclosure, the sending portion 503 is specifically configured to generate a hash value corresponding to the address set ciphertext, and send the address set ciphertext and the hash value to the blockchain network.

Further, in an embodiment of the present disclosure, the receiving portion 504 is specifically configured to receive the target index value corresponding to the hash value returned by the blockchain network.

Further, in an embodiment of the present disclosure, the storage portion 507 is configured to store the target index value and the hash value after sending the address set ciphertext and the hash value to the blockchain network and receiving the target index value corresponding to the hash value returned by the blockchain network.

Further, in an embodiment of the present disclosure, the receiving portion 504 is further configured to receive a download request after storing the address set ciphertext to the blockchain network and receiving the target index value returned by the blockchain network. The download request carries the target index value.

Further, in an embodiment of the present disclosure, the sending portion 503 is further configured to send the target index value to the blockchain network.

Further, in an embodiment of the present disclosure, the receiving portion 504 is further configured to receive the address set ciphertext returned by the blockchain network.

Further, in an embodiment of the present disclosure, the decryption portion 508 is configured to decrypt the address set ciphertext to obtain the address set corresponding to the to-be-stored file. The address set includes the M pieces of address information.

Further, in an embodiment of the present disclosure, the sending portion 503 is further configured to send the M pieces of address information to the IPFS.

Further, in an embodiment of the present disclosure, the receiving portion 504 is further configured to receive the N sub-files corresponding to the to-be-stored file returned by the IPFS.

Further, in an embodiment of the present disclosure, the merge portion 509 is configured to perform a merge operation on the N sub-files to obtain the to-be-stored file.

Further, in an embodiment of the present disclosure, the decryption portion 508 is specifically configured to decrypt the address set ciphertext using the private key to obtain the address set corresponding to the to-be-stored file.

Further, in an embodiment of the present disclosure, the download request carries the hash value, and the determination portion 510 is configured to determine the target index value corresponding to the hash value before decrypting the address set ciphertext to obtain the address set corresponding to the to-be-stored file.

Further, in an embodiment of the present disclosure, the sending portion 503 is further configured to send the target index value to the blockchain network.

Further, in an embodiment of the present disclosure, the receiving portion 504 is further configured to receive the address set ciphertext returned by the blockchain network.

Figure 14:
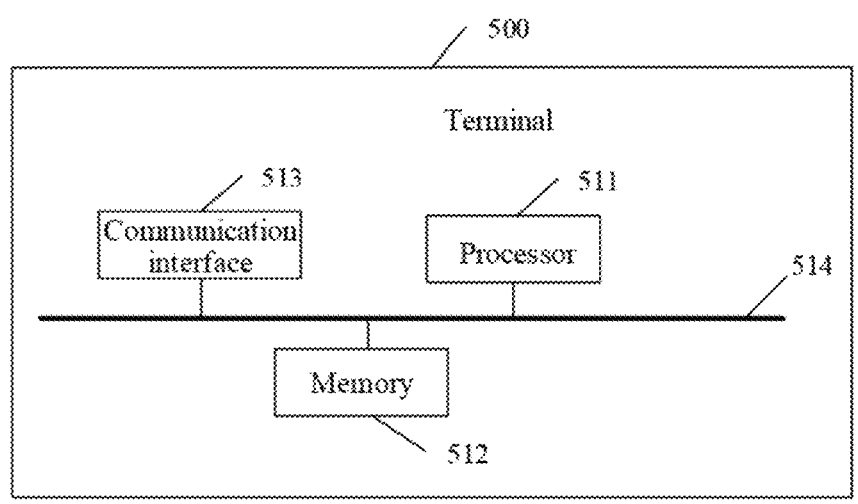
FIG. 14 is a second schematic structural diagram of a terminal according to an embodiment of the present disclosure.

In an embodiment of the present disclosure, FIG. 14 is a second schematic structural diagram of a terminal according to an embodiment of the present disclosure. As shown in FIG. 14, the terminal 500 according to the embodiment of the present disclosure may further include a processor 511 and a memory 512 storing executable instructions of the processor 511. Further, the terminal 500 may further include a communication interface 513 and a bus 514 for connecting the processor 511, the memory 512 and the communication interface 513.

In an embodiment of the present disclosure, the processor 511 may be at least one of an application specific integrated circuit (ASIC), a digital signal processor (DSP), a digital signal processing device (DSPD), a programmable logic device (PLD), a field programmable gate array (FPGA), a central processing unit (CPU), a controller, a microcontroller, and a microprocessor. It will be understood that the electronic devices for implementing the above-described processor functions for different devices may be other electronic devices, which are not specifically limited in this embodiment of the present disclosure. The terminal 500 may further include the memory 512, which may be connected to the processor 511. The memory 512 is configured to store executable program codes including computer operation instructions. The memory 512 may include a high-speed RAM memory, or a non-volatile memory, such as at least two disk memories.

In an embodiment of the present disclosure, the bus 514 is used to connect the communication interface 513, the processor 511, and the memory 512 and to enable communication between these devices.

In an embodiment of the present disclosure, the memory 512 is used to store instructions and data.

Further, in an embodiment of the present disclosure, the processor 511 is configured to obtain a to-be-stored file, perform splitting processing on the to-be-stored file to obtain N sub-files corresponding to the to-be-stored file, wherein N is an integer greater than or equal to 1; sending the N sub-files to an IPFS and receiving M pieces of address information corresponding to the N sub-files returned by the IPFS, wherein M is an integer greater than or equal to 1 and less than or equal to N: generating an address set corresponding to the to-be-stored file according to the M pieces of address information, and encrypting the address set to obtain an address set ciphertext; sending the address set ciphertext to a blockchain network and receiving a target index value returned by the blockchain network, wherein the target index value is used to identify the address set ciphertext.

In practical applications, the memory 512 may be a volatile memory (such as a random access memory (RAM)), or a non-volatile memory (such as a read-only memory (ROM), a flash memory, a hard disk (HDD) or solid state disk (SSD)), or a combination of the above-described types of memories, and provide instructions and data to the processor 511.

In addition, the functional modules in the present embodiment may be integrated into one processing unit, or each unit may be physically existed alone, or two or more units may be integrated into one unit. The integrated unit may be implemented in the form of hardware or a software function module.

If the integrated unit is implemented in the form of a software functional module and is not sold or used as a stand-alone product, it may be stored in a computer-readable storage medium. Based on such understanding, the technical solution of the present embodiment essentially, or part of the contribution of the technical solution to the related art, or all or part of the technical solution may be embodied in the form of a software product. The software product is stored in a storage medium including several instructions for causing a computer device (which may be a personal computer, a server, a network device, or the like) or a processor to perform all or part of the operations of the method of the present embodiment. The foregoing storage medium includes a USB flash drive, a removable hard disk, a read only memory (ROM), a random access memory (RAM), a magnetic disk, or an optical disc, which can store program codes.

A terminal according to an embodiment of the present disclosure obtains a to-be-stored file, and performs splitting processing on the to-be-stored file to obtain N sub-files corresponding to the to-be-stored file, wherein N is an integer greater than or equal to 1: sends the N sub-files to the IPFS and receives M pieces of address information corresponding to the N sub-files returned by the IPFS, wherein M is an integer greater than or equal to 1 and less than or equal to N; generates an address set corresponding to a to-be-stored file according to the M pieces of address information, and encrypts the address set to obtain an address set ciphertext: stores the address set ciphertext to a blockchain network and receives a target index value returned by the blockchain network, wherein the target index value is used to identify address set ciphertext. That is, in the embodiment of the present disclosure, the terminal splits and uploads the to-be-stored file to the IPFS, generates the address set according to received addresses corresponding to a plurality of sub-files returned by the IPFS, encrypts the address set, and further stores the address set ciphertext to the blockchain network. It not only overcomes, to a large extent, the defects of excessive pressure on the server side caused by the existing file storage methods, but also reduces the amount of stored data, provides efficient encryption and high file storage security, greatly meeting the storage requirements of files having a large amount of data.

Embodiments of the present disclosure provide a computer-readable storage medium on which a program is stored that when executed by a processor implements the file storage method as described above.

Specifically, a program instruction corresponding to the file storage method in this embodiment may be stored on a storage medium such as an optical disc, a hard disk, or a U disk. When the program instruction corresponding to the file storage method in the storage medium is read or executed by an electronic device, the method includes the following operations.

A to-be-stored file is obtained, and splitting processing is performed on the to-be-stored file to obtain N sub-files corresponding to the to-be-stored file. N is an integer greater than or equal to 1:

The N sub-files are sent to an IPFS, and M pieces of address information corresponding to the N sub-files returned by the IPFS is received. M is an integer greater than or equal to 1 and less than or equal to N.

An address set corresponding to the to-be-stored file is generated according to the M pieces of address information, and the address set is encrypted to obtain an address set ciphertext;

The address set ciphertext is sent to a blockchain network and a target index value returned by the blockchain network is received. The target index value is used to identify the address set ciphertext.

Those skilled in the art will appreciate that embodiments of the present disclosure may be provided as methods, systems, or computer program products. Accordingly, the present disclosure may take the form of a hardware embodiment, a software embodiment, or an embodiment combining software and hardware aspects. Further, the present disclosure may take the form of a computer program product implemented on one or more computer-usable storage medium (including, but not limited to, magnetic disk storage, optical storage, or the like) in which computer-usable program codes are contained.

The present disclosure is described with reference to a schematic flowchart and/or block diagram of an implementation of a method, a device (system), and a computer program product according to an embodiment of the present disclosure. It should be understood that each of the flowcharts and/or block diagrams may be implemented by computer program instructions, and that a combination of the flowcharts and/or block diagrams may be implemented. These computer program instructions may be provided to a processor of a general purpose computer, a dedicated computer, an embedded processor, or other programmable data processing device to generate a machine such that instructions executed by the processor of the computer or other programmable data processing device generate means for implementing the functions specified in one or more of the flow charts and/or one or more of the block diagrams.

The computer program instructions may also be stored in a computer-readable memory capable of directing a computer or other programmable data processing device to operate in a particular manner such that the instructions stored in the computer-readable memory produce articles of manufacture including instructions that implement the functions specified in one or more of the flowcharts and/or one or more of the block diagrams.

These computer program instructions may also be loaded onto a computer or other programmable data processing device such that a series of operational steps are performed on the computer or other programmable device to generate computer-implemented processing such that the instructions executed on the computer or other programmable device provide steps for implementing the functions specified in one or more of the flowcharts and/or the block diagrams.

The foregoing description is merely a preferred embodiment of the present disclosure, and is not intended to limit the scope of protection of the present disclosure.

INDUSTRIAL APPLICABILITY

Embodiments of the present disclosure disclose a file storage method, terminal, and storage medium. The file storage method includes: obtaining a to-be-stored file, and performing splitting processing on the to-be-stored file to obtain N sub-files corresponding to the to-be-stored file, wherein N is an integer greater than or equal to 1; sending the N sub-files to the IPFS and receiving M pieces of address information corresponding to the N sub-files returned by the IPFS, wherein M is an integer greater than or equal to 1 and less than or equal to N; generating an address set corresponding to the to-be-stored file according to the M pieces of address information, and encrypting the address set to obtain an address set ciphertext; sending the address set ciphertext to a blockchain network and receiving a target index value returned by the blockchain network, wherein the target index value is used to identify address set ciphertext. That is, in the embodiment of the present disclosure, the terminal splits and uploads the to-be-stored file to the IPFS, generates the address set according to received addresses corresponding to a plurality of sub-files returned by the IPFS, encrypts the address set, and further stores the address set ciphertext to the blockchain network. It not only overcomes, to a large extent, the defects of excessive pressure on the server side caused by the existing file storage methods, but also reduces the amount of stored data, provides efficient encryption and high file storage security, greatly meeting the storage requirements of files having a large amount of data.

The invention claimed is:

1. A file storage method, comprising:
obtaining a to-be-stored file, and performing splitting processing on the to-be-stored file to obtain N sub-files corresponding to the to-be-stored file, wherein N is an integer greater than or equal to 1;
sending the N sub-files to an InterPlanetary File System (IPFS) and receiving M pieces of address information corresponding to the N sub-files returned by the IPFS, wherein M is an integer greater than or equal to 1 and less than or equal to N;
generating an address set corresponding to the to-be-stored file according to the M pieces of address information, and encrypting the address set to obtain an address set ciphertext; and
sending the address set ciphertext to a blockchain network and receiving a target index value returned by the blockchain network, wherein the target index value is used to identify the address set ciphertext;
wherein encrypting the address set to obtain the address set ciphertext comprises:
randomly generating an asymmetric key pair, wherein the asymmetric key pair comprises a public key and a private key; and
encrypting the address set corresponding to the to-be-stored file using the public key to obtain the address set ciphertext;
wherein after sending the address set ciphertext to the blockchain network and receiving the target index value returned by the blockchain network, the method further comprises:

receiving a download request, wherein the download request carries the target index value;
sending the target index value to the blockchain network and receiving the address set ciphertext returned by the blockchain network;
decrypting the address set ciphertext to obtain the address set corresponding to the to-be-stored file, wherein the address set comprises the M pieces of address information;
sending the M pieces of address information to the IPFS and receiving the N sub-files corresponding to the to-be-stored file returned by the IPFS; and
performing a merge operation on the N sub-files to obtain the to-be-stored file.

2. The method of claim 1, wherein performing the splitting processing on the to-be-stored file to obtain the N sub-files corresponding to the to-be-stored file comprises:
determining a number of bytes corresponding to the to-be-stored file; and
splitting the to-be-stored file into the N sub-files according to the number of bytes.

3. The method of claim 1, wherein performing the splitting processing on the to-be-stored file to obtain the N sub-files corresponding to the to-be-stored file comprises:
determining an instruction parameter corresponding to the to-be-stored file; and
splitting the to-be-stored file into the N sub-files according to the instruction parameter.

4. The method of claim 1, wherein sending the address set ciphertext to the blockchain network and receiving the target index value returned by the blockchain network comprises:
generating a hash value corresponding to the address set ciphertext; and
sending the address set ciphertext and the hash value to the blockchain network and receiving the target index value corresponding to the hash value returned by the blockchain network.

5. The method of claim 4, wherein after sending the address set ciphertext and the hash value to the blockchain network and receiving the target index value corresponding to the hash value returned by the blockchain network, the method further comprises:
storing the target index value and the hash value.

6. The method of claim 1, wherein decrypting the address set ciphertext to obtain the address set corresponding to the to-be-stored file comprises:
decrypting the address set ciphertext using the private key to obtain the address set corresponding to the to-be-stored file.

7. The method of claim 1, wherein the download request carries a hash value, and before decrypting the address set ciphertext to obtain the address set corresponding to the to-be-stored file, the method further comprises:
determining the target index value corresponding to the hash value; and
sending the target index value to the blockchain network and receiving the address set ciphertext returned by the blockchain network.

8. A terminal comprising:
a memory for storing instructions executably by a processor; and
the processor for executing the instructions to:
obtain a to-be-stored file;
perform splitting processing on the to-be-stored file to obtain N sub-files corresponding to the to-be-stored file, wherein N is an integer greater than or equal to 1;
send the N sub-files to an InterPlanetary File System (IPF S);
receive M pieces of address information corresponding to the N sub-files returned by the IPFS, wherein M is an integer greater than or equal to 1 and less than or equal to N;
generate an address set corresponding to the to-be-stored file according to the M pieces of address information;
encrypt the address set to obtain an address set ciphertext;
send the address set ciphertext to a blockchain network; and
receive a target index value returned by the blockchain network, wherein the target index value is used to identify the address set ciphertext;
wherein the processor is further configured to execute the instructions to randomly generate an asymmetric key pair comprising a public key and a private key, and encrypt the address set corresponding to the to-be-stored file using the public key to obtain the address set ciphertext;
wherein the processor is further configured to execute the instructions to receive a download request after the address set ciphertext is stored to the blockchain network and the target index value returned by the blockchain network is received, wherein the download request carries the target index value; and the processor is further configured to execute the instructions to:
send the target index value to the blockchain network;
receive the address set ciphertext returned by the blockchain network;
decrypt the address set ciphertext to obtain the address set corresponding to the to-be-stored file, wherein the address set comprises the M pieces of address information;
send the M pieces of address information to the IPFS;
receive the N sub-files corresponding to the to-be-stored file returned by the IPFS; and
perform a merge operation on the N sub-files to obtain the to-be-stored file.

9. The terminal of claim 8, wherein the processor is further configured to execute the instructions to
determine a number of bytes corresponding to the to-be-stored file, and split the to-be-stored file into the N sub-files according to the number of bytes.

10. The terminal of claim 8, wherein the processor is further configured to execute the instructions to
determine an instruction parameter corresponding to the to-be-stored file, and split the to-be-stored file into the N sub-files according to the instruction parameter.

11. The terminal of claim 8, wherein the processor is further configured to execute the instructions to
generate a hash value corresponding to the address set ciphertext, and send the address set ciphertext and the hash value to the blockchain network; and_receive the target index value corresponding to the hash value returned by the blockchain network.

12. The terminal of claim 11, wherein
is the memory is further configured to store the target index value and the hash value after the address set ciphertext and the hash value is sent to the blockchain network and the target index value corresponding to the hash value returned by the blockchain network is received.

13. The terminal of claim 8, wherein the processor is further configured to execute the instructions to decrypt the address set ciphertext using the private key to obtain the address set corresponding to the to-be-stored file.

14. The terminal of claim 8, wherein the download request carries a hash value, and the processor is further configured to execute the instructions to:
   determine the target index value corresponding to the hash value before decrypting the address set ciphertext to obtain the address set corresponding to the to-be-stored file;
   send the target index value to the blockchain network; and
   receive the address set ciphertext returned by the blockchain network.

15. A computer-readable storage medium applied to a terminal and having stored thereon a program that when executed by a processor, implements a file storage method, the method comprising:
   obtaining a to-be-stored file, and performing splitting processing on the to-be-stored file to obtain N sub-files corresponding to the to-be-stored file, wherein N is an integer greater than or equal to 1,
   sending the N sub-files to an InterPlanetary File System (IPFS) and receiving M pieces of address information corresponding to the N sub-files returned by the IPFS, wherein M is an integer greater than or equal to 1 and less than or equal to N;
   generating an address set corresponding to the to-be-stored file according to the M pieces of address information, and encrypting the address set to obtain an address set ciphertext; and
   sending the address set ciphertext to a blockchain network and receiving a target index value returned by the blockchain network, wherein the target index value is used to identify the address set ciphertext;
   wherein encrypting the address set to obtain the address set ciphertext comprises:
   randomly generating an asymmetric key pair, wherein the asymmetric key pair comprises a public key and a private key; and
   encrypting the address set corresponding to the to-be-stored file using the public key to obtain the address set ciphertext;
   wherein after sending the address set ciphertext to the blockchain network and receiving the target index value returned by the blockchain network, the method further comprises:
   receiving a download request, wherein the download request carries the target index value;
   sending the target index value to the blockchain network and receiving the address set ciphertext returned by the blockchain network;
   decrypting the address set ciphertext to obtain the address set corresponding to the to-be-stored file, wherein the address set comprises the M pieces of address information;
   sending the M pieces of address information to the IPFS and receiving the N sub-files corresponding to the to-be-stored file returned by the IPFS; and
   performing a merge operation on the N sub-files to obtain the to-be-stored file.

\* \* \* \* \*